(12) United States Patent
Fukao et al.

(10) Patent No.: US 9,829,102 B2
(45) Date of Patent: Nov. 28, 2017

(54) CONTROL SYSTEM FOR VEHICLE

(71) Applicant: TOYOTA JIDOSHA KABUSHIKI KAISHA, Toyota-shi, Aichi-ken (JP)

(72) Inventors: Mitsuhiro Fukao, Toyota (JP); Kenji Matsuo, Toyota (JP); Hiroki Kondo, Miyoshi (JP); Akira Hino, Toyota (JP); Daisuke Inoue, Toyota (JP); Atsushi Ayabe, Toyota (JP); Akihide Ito, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/129,691

(22) PCT Filed: Apr. 2, 2015

(86) PCT No.: PCT/IB2015/052444
§ 371 (c)(1),
(2) Date: Sep. 27, 2016

(87) PCT Pub. No.: WO2015/151061
PCT Pub. Date: Oct. 8, 2015

(65) Prior Publication Data
US 2017/0138473 A1     May 18, 2017

(30) Foreign Application Priority Data

Apr. 3, 2014 (JP) .................................. 2014-077398
Apr. 2, 2015 (JP) .................................. 2015-076387

(51) Int. Cl.
*F16H 61/662* (2006.01)
*F16H 61/70* (2006.01)
(Continued)

(52) U.S. Cl.
CPC ....... *F16H 61/702* (2013.01); *B60R 16/0231* (2013.01); *B60W 30/182* (2013.01);
(Continued)

(58) Field of Classification Search
CPC ......... F16H 37/0846; F16H 2037/0873; F16H 61/662; F16H 61/702; F16H 2061/66213;
(Continued)

(56) References Cited

U.S. PATENT DOCUMENTS 4,610,183 A     9/1986 Nobumoto et al.
5,669,846 A *   9/1997 Moroto ............... F16H 37/0846
                                              475/211

(Continued)

FOREIGN PATENT DOCUMENTS

EP     1079496 A2     2/2001
JP     S60-95255 A    5/1985
(Continued)

*Primary Examiner* — Edwin A Young
(74) *Attorney, Agent, or Firm* — Oliff PLC

(57) ABSTRACT

In a vehicle in which a continuously variable transmission and a gear mechanism are provided in parallel on a power transmission pathway between an input shaft and an output shaft, (i) an electronic control unit performs CVT shifting, in view of shift characteristics of C to C shifting in which the speed ratio is changed in stages, or (ii) then electronic control unit performs C to C shifting, in view of shift characteristics of CVT shifting in which the speed ratio is steplessly changed.

11 Claims, 9 Drawing Sheets

(51) Int. Cl.
*B60R 16/023* (2006.01)
*F16H 37/08* (2006.01)
*B60W 30/182* (2012.01)

(52) U.S. Cl.
CPC ....... *F16H 37/0846* (2013.01); *F16H 61/662* (2013.01); *F16H 2037/0873* (2013.01); *F16H 2061/66213* (2013.01)

(58) Field of Classification Search
CPC ... B60W 10/101; B60W 10/107; B60W 10/11
See application file for complete search history.

(56) References Cited

U.S. PATENT DOCUMENTS

| | | | |
|---|---|---|---|
| 6,605,946 | B1 | 8/2003 | Yokoyama |
| 2004/0204287 | A1* | 10/2004 | Vornhem ............ F16H 37/0846 477/46 |
| 2005/0096822 | A1 | 5/2005 | Aoki |
| 2007/0021259 | A1* | 1/2007 | Tenberge ............... B60K 6/445 475/5 |
| 2007/0238569 | A1 | 10/2007 | Sato |
| 2009/0128157 | A1 | 5/2009 | Moriya |
| 2009/0204314 | A1 | 8/2009 | Aoki et al. |
| 2012/0029746 | A1 | 2/2012 | Ito et al. |

FOREIGN PATENT DOCUMENTS

| | | |
|---|---|---|
| JP | H11-257115 A | 9/1999 |
| JP | 2001-069681 A | 3/2001 |
| JP | 2005-140174 A | 6/2005 |
| JP | 2006-022710 A | 1/2006 |
| JP | 2007-225562 A | 9/2007 |
| JP | 2007-278475 A | 10/2007 |
| JP | 2009-138647 A | 6/2009 |
| JP | 2010-138961 A | 6/2010 |
| JP | 2012-052505 A | 3/2012 |

* cited by examiner

CONTROL SYSTEM FOR VEHICLE

BACKGROUND OF THE INVENTION

1. Field of the Invention

The invention relates to a control system for a vehicle including a stepless speed change mechanism and a power transmission mechanism provided in parallel on a power transmission pathway between a driving power source and drive wheels.

2. Description of Related Art

One type of vehicle is well known which includes a stepless speed change mechanism, a power transmission mechanism in which one gear position or two or more gear positions is/are formed, an input rotary member to which power of a driving power source is transmitted, and an output rotary member that delivers the power to drive wheels. In the vehicle, the stepless speed change mechanism and the power transmission mechanism are provided in parallel with each other on the power transmission pathway between the input rotary member and the output rotary member. One example of this type of vehicle is described in Japanese Patent Application Publication No. 2007-278475 (JP 2007-278475 A). In a transmission of the vehicle disclosed in JP 2007-278475 A, a stepless speed change mechanism and a stepped speed change mechanism having a LOW fixed-ratio position and an overdrive fixed-ratio position are arranged in parallel with each other, between an input rotary member and an output rotary member. When the vehicle is started, power is transmitted through the stepped speed change mechanism placed in the LOW fixed-ratio position. As the vehicle speed increases to some extent, power is transmitted through the stepless speed change mechanism, in place of the stepped speed change mechanism. When the vehicle speed further increases, power is transmitted through the stepped speed change mechanism placed in the overdrive fixed-ratio position. These manners of transmitting power via the transmission are also described in JP 2007-278475 A.

SUMMARY OF THE INVENTION

Generally, the speed ratio of a stepless speed change mechanism is changed so that an engine operating point (an operating point indicating operating conditions of the engine 12 determined by the engine speed and engine torque, for example) moves along the engine optimum fuel economy line. Accordingly, when the speed ratio of the stepless speed change mechanism is changed, the input rotational speed of the stepless speed change mechanism is kept substantially constant irrespective of the vehicle speed, or the input rotational speed of the stepless speed change mechanism is smoothly (or continuously) changed. On the other hand, generally, when the gear ratio is changed in a power transmission mechanism provided with two or more gear positions, the input rotational speed of the power transmission mechanism is changed in stages (in a stepwise manner), so as to establish a selected one of the two or more gear positions having different gear ratios. Therefore, in the vehicle in which the stepless speed change mechanism and power transmission mechanism having different shift characteristics are provided in parallel with each other on the power transmission pathway between the input and output shafts, a difference arises in the feeling between the stepped speed change caused by the power transmission mechanism and the stepless speed change caused by the stepless speed change mechanism. Namely, a difference arises in the shift feeling (driveability) between a stepped-speed-change running region in which the gear ratio of the power transmission mechanism is changed in stages or in a stepwise manner, and a stepless-speed-change running region in which the speed ratio of the stepless speed change mechanism is steplessly or continuously changed. Accordingly, the driver may feel strange or uncomfortable. Where the power transmission mechanism has only one gear position, the gear ratio is not changed in stages in the transmission mechanism itself. However, when the power transmission pathway is switched between a power transmission pathway through which power is transmitted via the stepless speed change mechanism, and a power transmission pathway through which power is transmitted via the power transmission mechanism, the input rotational speed is changed in a stepwise manner, so that the gear ratio or speed ratio is substantially changed in a stepwise manner. Accordingly, the driver may similarly feel strange or uncomfortable. The problems as described above have not been publicly known.

The invention provides a control system for a vehicle in which a stepless speed change mechanism and a power transmission mechanism are provided in parallel with each other on the power transmission pathway between an input rotary member and an output rotary member, which is able to achieve consistent shift feeling, throughout the entire running region including a stepped-speed-change running region and a stepless-speed-change running region.

According to a first aspect of the invention, a control system for a vehicle includes a driving power source, a stepless speed change mechanism, a power transmission mechanism, an input rotary member, drive wheels, an output rotary member, a clutch mechanism, and an electronic control unit. The power transmission mechanism has at least one gear position. Power from the driving power source is transmitted to the input rotary member. The output member is adapted to deliver the power to the drive wheels. The stepless speed change mechanism and the power transmission mechanism are provided in parallel on a power transmission pathway between the input rotary member and the output rotary member. The clutch mechanism is adapted to switch a power transmission pathway between a first power transmission pathway and a second power transmission pathway. The first power transmission pathway is adapted to permit the power of the driving power source to be transmitted toward the drive wheels via the stepless speed change mechanism, and the second power transmission pathway is adapted to permit the power of the driving power source to be transmitted toward the driving wheels via the power transmission mechanism. The electronic control unit is configured to perform a shift in the stepless speed change mechanism so as to change a rotational speed of the input rotary member in a stepwise manner, according to shift characteristics of a shift performed in the power transmission mechanism, or shift characteristics of a shift realized by switching between the first power transmission pathway and the second power transmission pathway. The shift characteristics include a value of the rotational speed of the input rotary member obtained at a point in time at which the shift is started.

According to the above aspect of the invention, in the vehicle in which the stepless speed change mechanism and the power transmission mechanism are provided in parallel on a power transmission pathway between the input rotary member and the output rotary member, shift characteristics of stepped shifting performed in the power transmission mechanism, or shift characteristics of stepped shifting realized upon switching between the first power transmission pathway and the second power transmission pathway, are substantially identical with shift characteristics performed in the stepless speed change mechanism such that the rotational speed of the input rotary member is changed in a stepwise manner. Accordingly, the value of the rotational speed of the input rotary member obtained at the time when each shift is started is controlled to the same value, and consistent shift feeling (driveability) can be achieved, throughout the entire running region including a stepped-speed-change running region in which the speed ratio is changed in stages and a stepless-speed-change running region in which the speed ratio is steplessly or continuously varied.

According to a second aspect of the invention, a control system for a vehicle, the control system includes: a driving power source; an input rotary member configured to transmit power of the driving power source; at least one drive wheel; a stepless speed change mechanism provided on a first power transmission pathway, the first power transmission pathway being defined between the driving power source and the drive wheel; a power transmission mechanism including at least one gear position, the power transmission mechanism being provided on a second power transmission pathway, the second power transmission pathway being defined between the driving power source and the drive wheel; an output rotary member configured to deliver the power to the drive wheel, the stepless speed change mechanism and the power transmission mechanism being provided in parallel on a power transmission pathway between the input rotary member and the output rotary member; a clutch mechanism configured to switch the power transmission pathway between the first power transmission pathway and the second power transmission pathway; and an electronic control unit configured to perform a shift in the stepless speed change mechanism so as to change a rotational speed of the input rotary member in a stepwise manner, according to shift characteristics of a shift performed in the power transmission mechanism, or according to shift characteristics of a shift realized by switching between the first power transmission pathway and the second power transmission pathway, the shift characteristics including a shift time required from the start of the shift to completion of the shift.

According to the above aspect of the invention, in the vehicle in which the stepless speed change mechanism and the power transmission mechanism are provided in parallel on a power transmission pathway between the input rotary member and the output rotary member, shift characteristics of stepped shifting performed in the power transmission mechanism, or shift characteristics of stepped shifting realized upon switching between the first power transmission pathway and the second power transmission pathway, are substantially identical with shift characteristics performed in the stepless speed change mechanism such that the rotational speed of the input rotary member is changed in a stepwise manner. Accordingly, the shift time required from the start of each shift to completion of the shift is controlled to be equal, and consistent shift feeling (driveability) can be achieved, throughout the entire running region including a stepped-speed-change running region in which the speed ratio is changed in stages and a stepless-speed-change running region in which the speed ratio is steplessly or continuously varied.

According to a third aspect of the invention, a control system for a vehicle, the control system includes: a driving power source; an input rotary member configured to transmit power of the driving power source; at least one drive wheel; a stepless speed change mechanism provided on a first power transmission pathway, the first power transmission pathway being defined between the driving power source and the drive wheel; a power transmission mechanism including at least one gear position, the power transmission mechanism being provided on a second power transmission pathway, the second power transmission pathway being defined between the driving power source and the drive wheel; an output rotary member configured to deliver the power to the drive wheel, the stepless speed change mechanism and the power transmission mechanism being provided in parallel on a power transmission pathway between the input rotary member and the output rotary member; a clutch mechanism configured to switch the power transmission pathway between the first power transmission pathway and the second power transmission pathway; and an electronic control unit configured to perform a shift in the stepless speed change mechanism so as to change a rotational speed of the input rotary member in a stepwise manner, according to shift characteristics of a shift performed in the power transmission mechanism, or according to shift characteristics of a shift realized by switching between the first power transmission pathway and the second power transmission pathway, the shift characteristics including an amount of change of the rotational speed of the input rotary member, over a period between the start of the shift and completion of the shift.

According to the above aspect of the invention, in the vehicle in which the stepless speed change mechanism and the power transmission mechanism are provided in parallel on a power transmission pathway between the input rotary member and the output rotary member, shift characteristics of stepped shifting performed in the power transmission mechanism, or shift characteristics of stepped shifting realized upon switching between the first power transmission pathway and the second power transmission pathway, are substantially identical with shift characteristics performed in the stepless speed change mechanism such that the rotational speed of the input rotary member is changed in a stepwise manner. Accordingly, the amount of change of the rotational speed of the input rotary member, over the period from the start of each shift to completion of the shift, is controlled to substantially the same amount, and consistent shift feeling (driveability) can be achieved, throughout the entire running region including a stepped-speed-change running region in which the speed ratio is changed in stages and a stepless-speed-change running region in which the speed ratio is steplessly or continuously varied.

In the control system as described above, the electronic control unit may be configured to perform a shift in the stepless speed change mechanism, according to shift characteristics of a shift performed in the power transmission mechanism or shift characteristics of a shift realized by switching between the first power transmission pathway and the second power transmission pathway, when an amount of driving request made by a driver is larger than a predetermined value. With this arrangement, only under the situation where the amount of driving request made by the driver is relatively large, and the higher priority is given to running (power performance) than fuel economy performance, the rotational speed of the input rotary member is changed in a stepwise manner so as to perform a shift in the stepless speed change mechanism.

In the control system as described above, the vehicle may have a plurality of types of running modes, and may be adapted to run in a selected one of the running modes. The electronic control unit may be configured to (i) change both the shift characteristics of the shift performed in the power transmission mechanism, and the shift characteristics of the shift performed in the stepless speed change mechanism, or (ii) change both the shift characteristics of the shift realized by switching between the first power transmission pathway and the second power transmission pathway, and the speed change characteristics of the shift performed in the stepless speed change mechanism, in accordance with switching of the running modes. With this arrangement, consistent shift feeling that matches the selected running mode can be achieved, throughout the entire running region including the stepped-speed-change running region and the stepless-speed-change running region.

According to a fourth aspect of the invention, a control system for a vehicle, the control system includes: a driving power source; an input rotary member configured to transmit power of the driving power source; at least one drive wheel; a stepless speed change mechanism provided on a first power transmission pathway, the first power transmission pathway being defined between the driving power source and the drive wheel; a power transmission mechanism including at least one gear position, the power transmission mechanism being provided on a second power transmission pathway, the second power transmission pathway being defined between the driving power source and the drive wheel; an output rotary member configured to deliver the power to the drive wheel, the stepless speed change mechanism and the power transmission mechanism being provided in parallel on a power transmission pathway between the input rotary member and the output rotary member; a clutch mechanism configured to switch a power transmission pathway between the first power transmission pathway and the second power transmission pathway; and an electronic control unit configured to perform (i) a shift in the power transmission mechanism, or (ii) a shift realized by switching between the first power transmission pathway and the second power transmission pathway, such that a rotational speed of the input rotary member is continuously changed according to shift characteristics matched with shift characteristics of a shift performed in the stepless speed change mechanism, the shift characteristics including a value of the rotational speed of the input rotary member obtained at a point in time at which the shift is started, and an amount of change of the rotational speed of the input rotary member over a period from the start of the shift to completion of the shift.

According to the above aspect of the invention, in the vehicle in which the stepless speed change mechanism and the power transmission mechanism are provided in parallel on a power transmission pathway between the input rotary member and the output rotary member, shift characteristics of stepless shifting performed in the stepless shift mechanism are substantially identical with shift characteristics performed in the power transmission mechanism so as to continuously change the rotational speed of the input rotary member, or those of shifting realized upon switching between the first power transmission pathway and the second power transmission pathway so as to continuously change the rotational speed of the input rotary member. Accordingly, the value of the rotational speed of the input rotary member obtained at the time when each shift is started, and the amount of change of the rotational speed of the input rotary member, over the period from the start of each shift to completion of the shift, are controlled to be equal, and consistent shift feeling (driveability) can be achieved, throughout the entire running region including a stepped-speed-change running region and a stepless-speed-change running region.

In the control system as described above, the electronic control unit may be configured to perform a shift in the power transmission mechanism, or a shift realized by switching between the first power transmission pathway and the second power transmission pathway, according to shift characteristics performed in the stepless speed change mechanism, when an amount of driving request made by a driver is equal to or smaller than a predetermined value. With this arrangement, under the situation where the amount of driving request made by the driver is relatively small, and the higher priority is given to the fuel economy performance than running (power performance), the gear ratio or speed ratio of the power transmission mechanism can be changed such that the rotational speed of the input rotary member is continuously changed, or the gear ratio can be changed upon switching between the first power transmission pathway and the second transmission pathway, such that the rotational speed of the input rotary member is continuously changed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Some embodiments of the invention will be described in detail with reference to the drawings.

Figure 1:
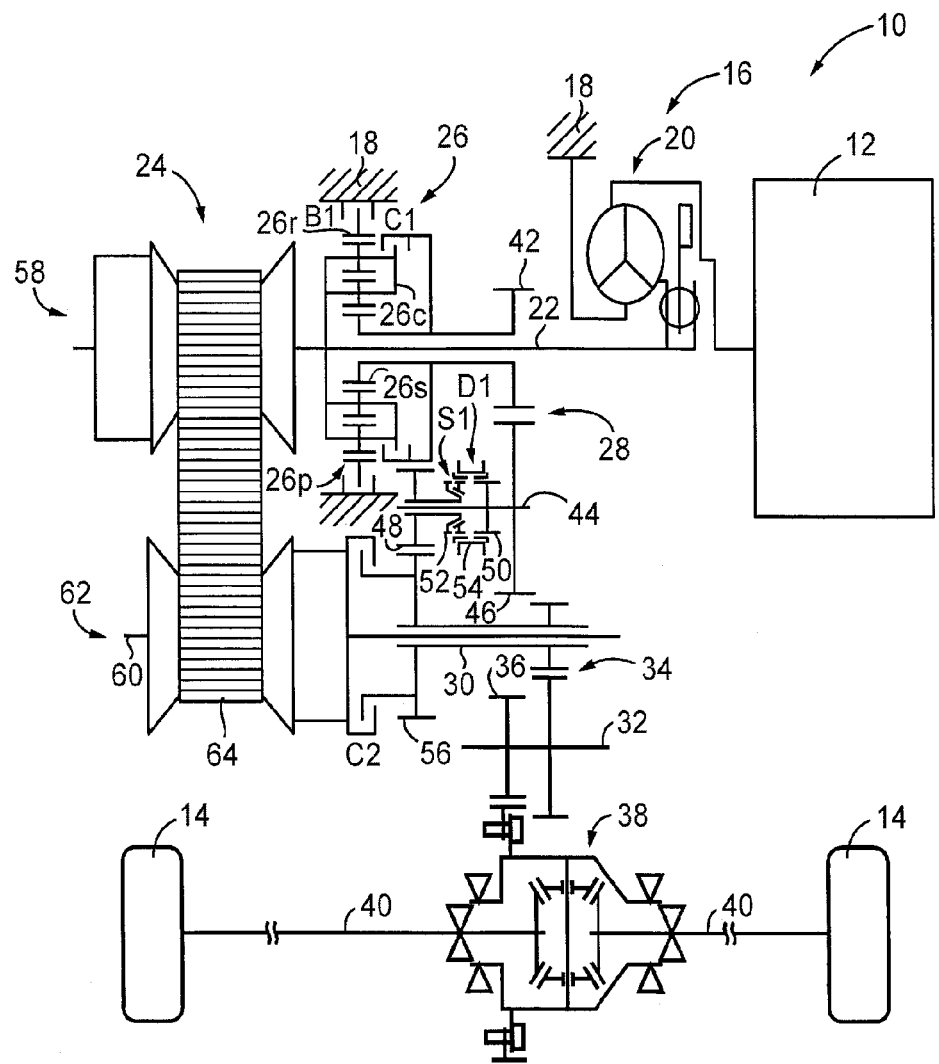
FIG. 1 is a view schematically illustrating the configuration of a vehicle to which the invention is applied.

FIG. 1 is a view schematically showing the configuration of a vehicle 10 to which this invention is applied. In FIG. 1, the vehicle 10 includes an engine 12 that functions as a driving power source for running the vehicle, drive wheels 14, and a power transmission system 16 provided between the engine 12 and the drive wheels 14. The power transmission system 16 includes various components housed within a housing 18 as a non-rotary member. More specifically, the power transmission system 16 includes a known torque converter 20 as a hydraulic power transmission device coupled to the engine 12, an input shaft 22 provided integrally with a turbine shaft as an output rotary member of the torque converter 20, a known belt-type continuously variable transmission 24 (which will be called "CVT 24") as a stepless speed change mechanism coupled to the input shaft 22, and a forward-reverse switching device 26 also coupled to the input shaft 22. The power transmission system 16 also includes a gear mechanism 28 as a power transmission mechanism coupled to the input shaft 22 via the forward-reverse switching device 26 and provided in parallel with the CVT 24, an output shaft 30 as a common output rotary member of the CVT 24 and the gear mechanism 28, and a counter shaft 32. The power transmission system 16 further includes a speed reducing gear device 34 that consists of a pair of meshing gears mounted on the output shaft 30 and the counter shaft 32, respectively, such that the gears cannot rotate relative to the output shaft 30 and the counter shaft 32, a differential gear unit 38 coupled to a gear 36 mounted on the counter shaft 32 such that the gear 36 cannot rotate relative to the counter shaft 32, and a pair of axles 40 coupled to the differential gear unit 38. In the power transmission system 16 thus constructed, power (that is synonymous with torque and force unless particularly distinguished therefrom) is transmitted to a pair of drive wheels 14, through the torque converter 20, CVT 24 (or the forward-reverse switching device 26 and the gear mechanism 28), reducing gear device 34, differential gear unit 38, and the axles 40, in the order of description.

Thus, the power transmission system 16 includes the CVT 24 and the gear mechanism 28, which are provided in parallel on the power transmission pathway between the engine 12 (or the input shaft 22) and the drive wheels 14 (or the output shaft 30). The input shaft 22 is an input rotary member to which power from the engine 12 is transmitted. The output shaft 30 is an output rotary member that delivers the power from the engine 12 to the drive wheels 14. Accordingly, the power transmission system 16 includes a first power transmission pathway through which the power from the engine 12 is transmitted from the input shaft 22 toward the drive wheels 14 (or the output shaft 30) via the CVT 24, and a second power transmission pathway through which the power from the engine 12 is transmitted from the input shaft 22 toward the drive wheels 14 (or the output shaft 30) via the gear mechanism 28. The CVT 24 is provided on the first power transmission pathway. The first power transmission pathway is defined between the engine 12 and the drive wheels 14. The gear mechanism 28 is provided on the second power transmission pathway. The second power transmission pathway is defined between the engine 12 and the drive wheels 14. The power transmission system 16 is arranged to switch between the first power transmission pathway and the second power transmission pathway, according to running conditions of the vehicle 10. To this end, the power transmission system 16 includes a clutch C2 for CVT running, as a first clutch mechanism, and a forward clutch C1 and a reverse brake B1 as a second clutch mechanism, as clutch mechanisms for switching the power transmission pathway of the power transmission system 16 between the first power transmission pathway and the second power transmission pathway. The first clutch mechanism selectively permits and inhibits power transmission in the first power transmission pathway. The second clutch mechanism selectively permits and inhibits power transmission in the second power transmission pathway. Each of the clutch C2 for CVT running, forward clutch C1, and the reverse brake B1 is one example of connecting/disconnecting devices. More specifically, each of the clutch C2 for CVT running, forward clutch C1, and the reverse brake B1 is a known hydraulic friction device (friction clutch) that is frictionally engaged by means of a hydraulic actuator. Also, each of the forward clutch C1 and the reverse brake B1 is one of elements that constitute the forward-reverse switching device 26, as will be described later.

The forward-reverse switching device 26 is provided around the input shaft 22, coaxially with the input shaft 22. The forward-reverse switching device 26 mainly consists of a double-pinion-type planetary gear train 26p, forward clutch C1 and the reverse brake B1. A carrier 26c of the planetary gear train 26p is coupled integrally to the input shaft 22. A ring gear 26r of the planetary gear train 26p is selectively coupled to the housing 18 via the reverse brake B1. A sun gear 26s of the planetary gear train 26p is coupled to a small-diameter gear 42 that is provided around the input shaft 22, coaxially with the input shaft 22, such that the gear 42 can rotate relative to the input shaft 22. Also, the carrier 26c and the sun gear 26s are selectively coupled to each other via the forward clutch C1. In the forward-reverse switching device 26 thus constructed, when the forward clutch C1 is engaged, and the reverse brake B1 is released, the input shaft 22 is directly coupled to the small-diameter gear 42, and a forward-drive power transmission pathway is established in the second power transmission pathway. When the reverse brake B1 is engaged, and the forward clutch C1 is released, the small-diameter gear 42 is rotated in the reverse direction relative to the input shaft 22, and a reverse-drive power transmission pathway is established in the second power transmission pathway. When the forward clutch C1 and the reverse brake B1 are both released, the second power transmission pathway is brought into a neutral state (power transmission cut-off state) in which power is inhibited from being transmitted through the second power transmission pathway.

The gear mechanism 28 includes the small-diameter gear 42, and a large-diameter gear 46 that meshes with the small-diameter gear 42 and is mounted on a gear-mechanism counter shaft 44 such that the gear 46 cannot rotate relative to the counter shaft 44. Accordingly, the gear mechanism 28 is a power transmission mechanism in which one gear position (gear ratio) is formed. An idler gear 48 is mounted coaxially on the gear-mechanism counter shaft 44 such that the idler gear 48 can rotate relative to the counter shaft 44. Further, a mesh-type clutch D1 that selectively connects and disconnects the gear-mechanism counter shaft 44 and the idler gear 48 to and from each other is provided around the gear-mechanism counter shaft 44, between the gear-mechanism counter shaft 44 and the idler gear 48. Accordingly, the mesh-type clutch D1 functions as a third clutch mechanism provided in the power transmission system 16 for permitting and inhibiting power transmission in the second power transmission pathway. More specifically, the mesh-type clutch D1 includes a first gear 50 mounted on the gear-mechanism counter shaft 44, a second gear 52 mounted on the idler gear 48, and a hub sleeve 54 formed with radially inner teeth that can engage or mesh with the first gear 50 and the second gear 52. In the mesh-type clutch D1 thus constructed, the gear-mechanism counter shaft 44 and the idler gear 48 are connected to each other when the hub sleeve 54 is engaged with the first gear 50 and the second gear 52. The mesh-type clutch D1 further includes a known synchromesh mechanism S1 as a synchronizing mechanism, which synchronizes rotation when the first gear 50 and the second gear 52 are engaged with each other. The idler gear 48 meshes with an output gear 56 having a larger diameter than the idler gear 48. The output gear 56 is mounted on the output shaft 30 about the same rotational axis as the output shaft 30, such that the output gear 56 cannot rotate relative to the output shaft 30. When one of the forward clutch C1 and the reverse brake B1 is engaged, and the mesh-type clutch D1 is engaged, the second power transmission pathway is established (connected) in which power from the engine 12 is transmitted from the input shaft 22 to the output shaft 30, through the forward-reverse switching device 26, gear mechanism 28, idler gear 48, and the output gear 56, in the order of description.

The CVT 24 is provided on a power transmission pathway between the input shaft 22 and the output shaft 30. The CVT 24 includes a primary pulley 58 mounted on the input shaft 22 and having a variable effective diameter, a secondary pulley 62 mounted on a rotary shaft 60 having the same axis as the output shaft 30 and having a variable effective diameter, and a transmission belt 64 that is engaged with the pair of variable-diameter pulleys 58, 62 to run between the pulleys 58, 62. The CVT 24 is operable to transmit power via friction force produced between the pair of variable-diameter pulleys 58, 62 and the transmission belt 64. In the CVT 24, the widths of V grooves of the pair of variable-diameter pulleys 58, 62 are changed, and the engaging diameter (effective diameter) of the transmission belt 64 is changed, such that the speed ratio (gear ratio) γ (=input shaft speed Ni/output shaft speed No) is continuously changed. For example, if the width of the V groove of the primary pulley 58 is reduced, the gear ratio γ is reduced (namely, the CVT 24 is shifted up). If the width of the V groove of the primary pulley 58 is increased, the gear ratio γ is increased (namely, the CVT 24 is shifted down). The output shaft 30 is disposed around the rotary shaft 60, coaxially with the rotary shaft 60, such that the output shaft 30 and the rotary shaft 60 can rotate relative to each other. The clutch C2 for CVT running is provided closer to the drive wheels 14 than the CVT 24. Namely, the clutch C2 for CVT running is provided between the secondary pulley 62 and the output shaft 30. The clutch C2 for CVT running selectively connects and disconnects the secondary pulley 62 and the output shaft 30 to and from each other. When the clutch C2 for CVT running is engaged, power from the engine 12 is transmitted from the input shaft 22 to the output shaft 30 via the CVT 24, so that the first power transmission pathway is established (connected).

Figure 2:
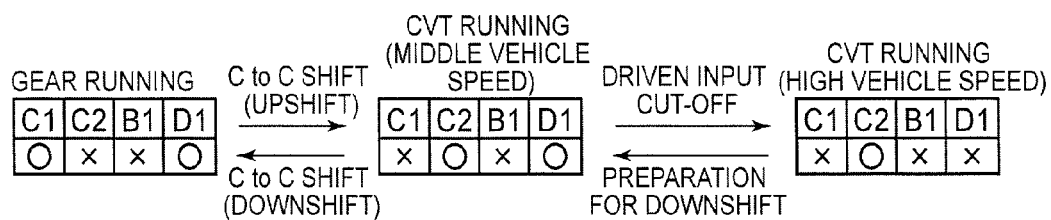
FIG. 2 is a view useful for explaining switching of running patterns of a power transmission system.

The operation of the power transmission system 16 will be described. FIG. 2 is a view useful for explaining the manner of switching running patterns of the power transmission system 16, using an engagement table indicating an engaged element or elements for each running pattern. In FIG. 2, C1 corresponds to an operating state of the forward clutch C1, and C2 corresponds to an operating state of the clutch C2 for CVT running. In FIG. 2, B1 corresponds to an operating state of the reverse brake B1, and D1 corresponds to an operating state of the mesh-type clutch D1. In FIG. 2, "0" represents an engaged (connected) state, and "x" represents a released (cut-off) state.

Initially, gear running as a running pattern in which power from the engine 12 is transmitted to the output shaft 30 via the gear mechanism 28 will be described. In this running pattern, power is transmitted through the second power transmission pathway. For example, in the gear running, the forward clutch C1 and the mesh clutch D1 are engaged, while the clutch C2 for CVT running and the reverse brake B1 are released, as shown in FIG. 2.

More specifically, when the forward clutch C1 is engaged, the planetary gear train 26p that constitutes the forward-reverse switching device 26 is rotated as a unit. As a result, the small-diameter gear 42 is rotated at the same rotational speed as the input shaft 22. Also, the small-diameter gear 42 meshes with the large-diameter gear 46 mounted on the gear-mechanism counter shaft 44. Thus, the gear-mechanism counter shaft 44 is similarly rotated. Furthermore, the mesh clutch D1 is engaged. Accordingly, the gear-mechanism counter shaft 44 and the idler gear 48 are connected to each other. With the idler gear 48 being in meshing engagement with the output gear 56, the output shaft 30 provided integrally with the output gear 56 is rotated. Thus, when the forward clutch C1 and the mesh clutch D1 are engaged, the power from the engine 12 is transmitted to the output shaft 30, via the torque converter 20, forward-reverse switching device 26, gear mechanism 28, idler gear 48, and so forth, in the order of description. In the gear running, the vehicle is able to run in the reverse direction if the reverse brake B1 and the mesh clutch D1 are engaged, and the clutch C2 for CVT running and the forward clutch C1 are released.

Next, CVT running as a running pattern in which the power from the engine 12 is transmitted to the output shaft 30 via the CVT 24 will be described. In this running pattern, power is transmitted through the first power transmission pathway. In the CVT running (high vehicle speed), the clutch C2 for CVT running is engaged, and the forward clutch C1, reverse brake B1, and the mesh clutch D1 are released, as indicated in a section of FIG. 2 labelled with "CVT RUNNING (HIGH VEHICLE SPEED)".

More specifically, when the clutch C2 for CVT running is engaged, the secondary pulley 62 and the output shaft 30 are connected. As a result, the secondary pulley 62 and the output shaft 30 are rotated as a unit. Thus, if the clutch C2 for CVT running is engaged, power from the engine 12 is transmitted to the output shaft 30, via the torque converter 20, continuously variable transmission 24, and so forth, in the order of description. The mesh clutch D1 is released during the CVT running (high vehicle speed), so as to eliminate dragging of the gear mechanism 28, etc. during CVT running, for example. Also, the mesh clutch D1 is released during the CVT running (high vehicle speed), so as to prevent the gear mechanism 28, etc. from rotating at a high speed when the vehicle runs at a high speed, for example.

The gear running is selected in a low-vehicle-speed region including a region where the vehicle is stopped (the vehicle is stationary), for example. The gear ratio γ1 (namely, the gear ratio EL established by the gear mechanism 28) established in the second power transmission pathway is set to a larger value (i.e., a lower gear ratio) than the maximum gear ratio γmax established by the CVT 24. The maximum gear ratio established by the CVT 24 is the lowest gear ratio as the gear ratio on the lowest vehicle-speed side. For example, the gear ratio γ1 is one example of the first-speed gear ratio γ1 as the gear ratio of the first-speed gear position in the power transmission system 16. The lowest gear ratio γmax of the CVT 24 is one example of the second-speed gear ratio γ2 as the gear ratio of the second-speed gear position in the power transmission system 16. Therefore, the gear running and the CVT running are switched, for example, according to a shift line for switching the gear position between the first-speed gear position and the second-speed gear position in a shift map of a known transmission having two or more gear positions. In the CVT running, for example, shifting (e.g., CVT shifting, stepless shifting) is carried out, using a known method, such that the gear ratio γ is changed based on running conditions, such as the accelerator pedal stroke θacc and the vehicle speed V. When the running pattern of the vehicle is switched from the gear running to the CVT running (high vehicle speed), or switched from the CVT running (high vehicle speed) to the gear running, the vehicle transiently goes through the CVT running (middle vehicle speed), as shown in FIG. 2.

When the vehicle running pattern is switched from the gear running to the CVT running (high vehicle speed), the operating condition of the power transmission system 16 is transiently changed from a condition where the forward clutch C1 and the mesh clutch D1 are engaged, to a condition where the clutch C2 for CVT running and the mesh clutch D1 are engaged. In other words, the running pattern is transiently switched from the gear running to the CVT running (middle vehicle speed). Namely, shifting (e.g., clutch-to-clutch shifting (which will be called C to C shifting)) is performed by replacing one clutch with another clutch, for example, releasing the forward clutch C1 and engaging the clutch C2 for CVT running. As a result, the power transmission pathway is changed from the second power transmission pathway to the first power transmission pathway. Thus, the power transmission system 16 is substantially shifted up. After switching of the power transmission pathway, the mesh clutch D1 is released (see "DRIVEN INPUT CUT-OFF" in FIG. 2) so as to prevent unnecessary dragging and increase in the rotational speed of the gear mechanism 28, etc. Thus, the mesh clutch D1 functions as a driven input cut-off clutch that cuts off input from the drive wheels 14 side.

When the vehicle running pattern is switched from the CVT running (high vehicle speed) to the gear running, the operating condition of the power transmission system 16 is transiently switched from a condition where the clutch C2 for CVT running is engaged, to a condition where the mesh clutch D1 is further engaged, in preparation for switching to the gear running (see "PREPARATION FOR DOWN-SHIFT" in FIG. 2). In other words, the running pattern is transiently switched from the CVT running (high vehicle speed) to the CVT running (middle vehicle speed). In the CVT running (middle vehicle speed), rotation is also transmitted to the sun gear 26s of the planetary gear train 26p via the gear mechanism 28. If shifting (e.g., clutch-to-clutch shifting) is performed by replacing one clutch with another clutch, for example, releasing the clutch C2 for CVT running and engaging the forward clutch C1, from the condition of the CVT running (middle vehicle speed), the vehicle is switched to the gear running. At this time, the power transmission pathway is changed from the first power transmission pathway to the second power transmission pathway. Thus, the power transmission system 16 is substantially shifted down.

Further, the vehicle 10 has two or more running modes (shift control modes) for running the vehicle 10, from which one running mode is selected. More specifically, the vehicle 10 has a normal mode, sporty mode (i.e., power mode), and an eco-mode, as the two or more running modes that are switched from one to another as needed. The normal mode, which is obtained in advance by experiment or by design and stored (i.e., predetermined), is provided for enabling the vehicle to run or operate in a condition of high fuel efficiency while assuring sufficient power performance. The sporty mode (or power mode), which is also determined in advance, is provided for enabling the vehicle to run or operate in a condition where the higher priority is given to the power performance than the fuel economy performance, as compared with the normal mode. The eco-mode, which is also determined in advance, is provided for enabling the vehicle to run or operate in a condition where the higher priority is given to the fuel economy performance than the power performance, as compared with the normal mode. The vehicle 10 is provided with a running mode selection switch 70 (see FIG. 3) that enables the driver to manually select one from the two or more running modes. For example, the running mode selection switch 70 is installed in the vicinity of the driver's seat. For example, the running mode selection switch 70 includes a sporty mode switch 72 for establishing the sporty mode as the running mode, and an eco-mode switch 74 for establishing the eco-mode as the running mode (see FIG. 3). The running mode selection switch 70 is, for example, a seesaw switch. When the driver pushes the sporty mode switch 72 or the eco-mode switch 74 of the running mode selection switch 70, the sporty mode or the eco-mode is selected (established). If neither of the sporty mode switch 72 and the eco-mode switch 74 of the running mode selection switch 70 is pushed, the normal mode is selected.

Figure 3:
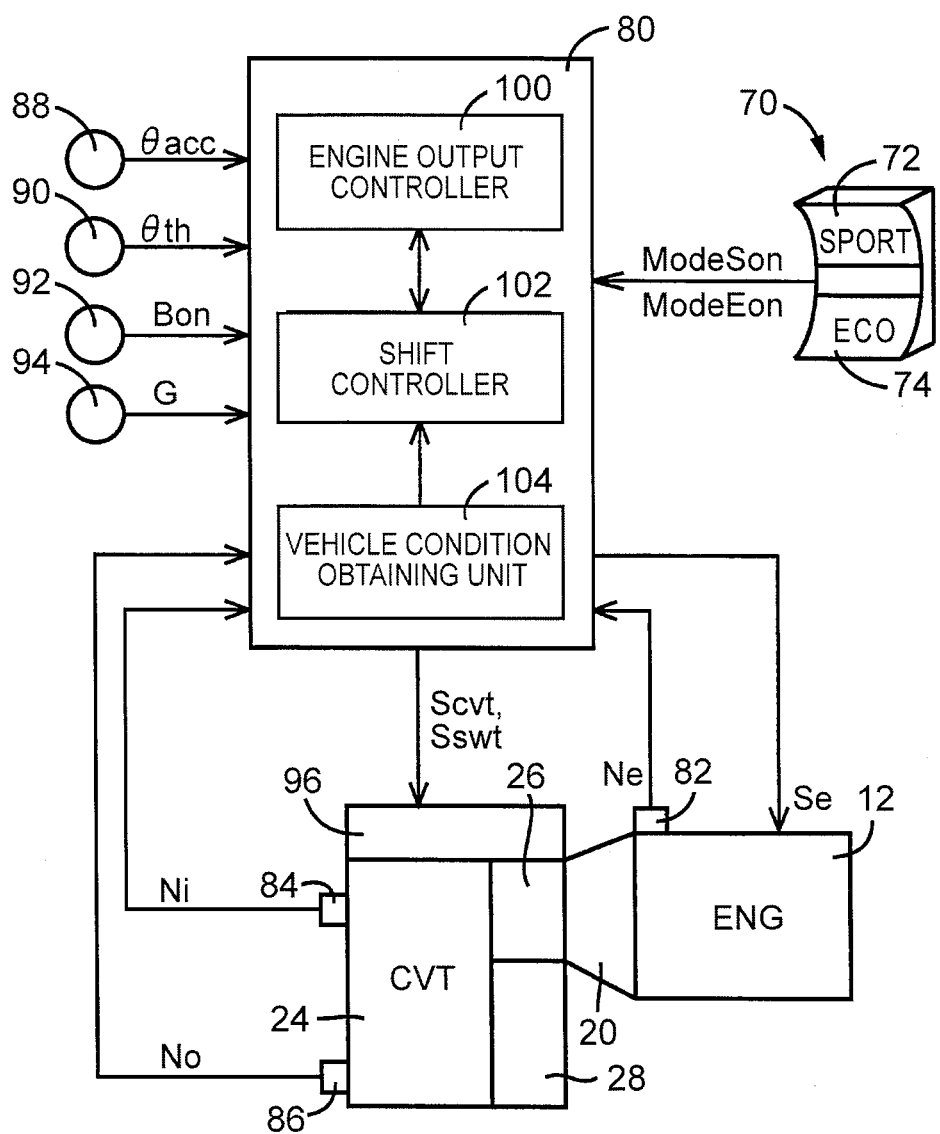
FIG. 3 is a view showing control functions and a principal part of a control system for various controls in the vehicle.

FIG. 3 is a view useful for explaining control functions and a principal part of a control system for various controls in the vehicle 10. In FIG. 3, the vehicle 10 is provided with an electronic control unit 80 including a controller of the vehicle 10 for switching the running pattern of the power transmission system 16, for example. Thus, FIG. 3 shows an input/output system of the electronic control unit 80. Also, FIG. 3 is a functional block diagram useful for explaining principal control functions performed by the electronic control unit 80. The electronic control unit 80 is configured to include a so-called microcomputer, which includes CPU, RAM, ROM, input and output interfaces, and so forth, for example. The CPU performs signal processing, according to programs stored in advance in the ROM, while utilizing the temporary storage function of the RAM, so as to execute various controls of the vehicle 10. For example, the electronic control unit 80 is configured to perform the output control of the engine 12, shift control and belt clamping force control of the CVT 24, control for switching the running pattern, and so forth. The electronic control unit 80 is divided as needed into an ECU for engine control, ECU for shift control, and so forth.

The electronic control unit 80 is supplied with various actual values based on detection signals obtained by various sensors provided in the vehicle 10. The various sensors include various rotational speed sensors 82, 84, 86, accelerator pedal position sensor 88, throttle opening sensor 90, foot brake switch 92, G sensor 94, and the running mode selection switch 70, for example. The various actual values include the engine speed Ne, input shaft speed Ni as the rotational speed of the primary pulley 58 corresponding to the turbine speed Nt, output shaft speed No as the rotational speed of the secondary pulley 62 corresponding to the vehicle speed V, accelerator pedal stroke θacc as the amount of operation of the accelerator pedal representing the amount of acceleration requested by the driver, throttle opening θth, brake ON Bon as a signal indicating a condition where the foot brake as a regular brake is operated, longitudinal acceleration G of the vehicle, and sporty-mode ON Mode- Son or eco-mode ON ModeEon as a signal indicating that the sporty mode switch 72 or the eco-mode switch 74 was operated by the user.

The electronic control unit 80 outputs engine output control command signals Se for use in output control of the engine 12, hydraulic control command signals Scvt for use in hydraulic control associated with shifting of the continuously variable transmission 24, hydraulic control command signals Sswt used for controlling the forward-reverse switching device 26, clutch C2 for CVT running, and the mesh clutch D1 in connection with switching of the miming pattern of the power transmission system 16, and so forth. More specifically, as the engine output control command signals Se, a throttle signal for controlling opening/closing of an electronic throttle valve by driving a throttle actuator, an injection signal for controlling the amount of fuel injected from fuel injectors, an ignition timing signal for controlling the ignition timing of ignition devices in the engine 12, etc. are generated. As the hydraulic control command signals Scvt, a command signal for driving a solenoid valve that regulates the primary pressure Pin supplied to the actuator of the primary pulley 58, a command signal for driving a solenoid valve that regulates the secondary pressure Pout supplied to the actuator of the secondary pulley 62, etc. are transmitted to a hydraulic control circuit 96. As the hydraulic control command signals Sswt, command signals for driving solenoid valves that control respective hydraulic pressures supplied to actuators, or the like, that operate the forward clutch C1, reverse brake B1, clutch C2 for CVT running, and the hub sleeve 54, are transmitted to the hydraulic control circuit 96.

The electronic control unit 80 includes an engine output controller 100, and a shift controller 102.

The engine output controller 100 transmits the engine output control command signals Se to the throttle actuator, fuel injectors, and the ignition devices, respectively, for output control of the engine 12, for example. The engine output controller 100 calculates required driving force Fdem as the amount of driving request made by the driver, based on the actual accelerator pedal stroke θacc and the vehicle speed V, from a predetermined relationship (driving force map) (not shown), for example. Then, the engine output controller 100 sets target engine torque Tetgt with which the required driving force Fdem can be obtained, and controls opening/closing of the electronic throttle valve by means of the throttle actuator, so as to achieve the target engine torque Tetgt. The engine output controller 100 also controls the fuel injection amount as the amount of fuel injected by the fuel injectors. The engine output controller 100 also controls the ignition timing of the ignition devices. When the sporty mode is selected, for example, the engine output controller 100 controls the electronic throttle valve, etc. so as to enhance the response to the accelerating operation of the driver, as compared with the case where the normal mode is selected. When the eco-mode is selected, the engine output controller 100 may control the electronic throttle valve, etc., such that the driving force changes more modestly in response to change in the accelerator pedal stroke θacc, for improvement of the practical fuel efficiency, as compared with the case where the normal mode is selected. As the amount of driving request, required driving torque [Nm] produced at the drive wheels 14, required driving power [W] produced at the drive wheels 14, required output torque [Nm] produced at the output shaft 30, and the required engine torque [Nm], for example, may be used, in addition to the required driving force Fdem [N] produced at the drive wheels 14. Also, as the amount of driving request, the accelerator pedal stroke θacc [%], the throttle opening θth [%], the intake air amount [g/sec] of the engine 12, or the like, may be simply used.

During CVT running, the shift controller 102 transmits the hydraulic control command signals Scvt for controlling the gear ratio γ of the CVT 24 such that the gear ratio γ becomes equal to the target gear ratio γtgt calculated based on the accelerator pedal stroke θacc, vehicle speed V, brake signal Bon, etc., to the hydraulic control circuit 96. More specifically, the shift controller 102 has a predetermined relationship (e.g., a CVT shift map, a belt clamping force map) that achieves the target gear ratio γtgt of the CVT 24 at which the operating point of the engine 12 lies on a predetermined optimum line (e.g., the engine optimum fuel efficiency line) while preventing the belt of the CVT 24 from slipping. The shift controller 102 determines a primary command pressure Pintgt as a command value of the primary pressure Pin, and a secondary command pressure Pouttgt as a command value of the secondary pressure Pout, based on the accelerator pedal stroke θacc and the vehicle speed V, for example, from the above-mentioned relationship. Then, the shift controller 102 transmits the primary command pressure Pintgt and the secondary command pressure Pouttgt to the hydraulic control circuit 96, so as to execute CVT shifting.

The shift controller 102 also performs switching control for switching the running pattern of the vehicle between gear running and CVT running. In the gear running, power from the engine 12 is transmitted to the output shaft 30 via the gear mechanism 28. In the CVT running, power from the engine 12 is transmitted to the output shaft 30 via the CVT 24. More specifically, the shift controller 102 determines whether the running pattern is to be switched during running of the vehicle. For example, the shift controller 102 determines a shift (change of the gear ratio), based on the vehicle speed V and the accelerator pedal stroke θacc, using an upshift line and a downshift line for switching between the first-speed gear ratio γ1 corresponding to the gear ratio EL established in the gear running, and the second-speed gear ratio γ2 corresponding to the lowest gear ratio γmax established in the CVT running. The shift controller 102 determines whether the running pattern is to be switched during running of the vehicle, based on the result of the above determination. The upshift line and downshift line are predetermined shift lines, for example, which have certain hysteresis, for example. When the sporty mode is selected, for example, the shift line may be switched to a sporty-running-time shift line that is predetermined such that the first-speed gear ratio γ1 is more likely to be selected, as compared with a normal shift line used when the normal mode is selected. When the eco-mode is selected, for example, the shift line may be switched to an eco-running-time shift line that is predetermined such that the second-speed gear ratio γ2 is more likely to be selected, as compared with the normal shift line used when the normal mode is selected.

When switching of the running pattern is determined, the shift controller 102 performs switching of the running pattern. For example, if the shift controller 102 determines an upshift during gear running, it switches the running pattern from the gear running to the CVT running (high vehicle speed). When the shift controller 102 switches the running pattern from the gear running to the CVT running (high vehicle speed), it initially makes an upshift through C to C shifting by releasing the forward clutch C1 and engaging the clutch C2 for CVT running. This condition is one example of CVT running (middle vehicle speed) to which the running pattern is transiently switched as shown in FIG. 2. Thus, the power transmission pathway in the power transmission system 16 is switched from the second power transmission pathway in which power is transmitted via the gear mechanism 28, to the first power transmission pathway in which power is transmitted via the CVT 24. Then, the shift controller 102 switches the running pattern to the CVT running (high vehicle speed), by generating a command to operate the hub sleeve 54 of the synchromesh mechanism S1 so as to release the mesh clutch D1 that is being engaged. The hub sleeve 54 is driven by a hydraulic actuator (not shown), and the hydraulic pressure supplied to the hydraulic actuator is controlled so as to adjust the pressing force applied to the hub sleeve 54.

If the shift controller 102 determines a downshift during CVT running (high vehicle speed), it switches the running pattern from the CVT running (high vehicle speed) to the gear running. When the shift controller 102 switches the running pattern from the CVT running (high vehicle speed) to the gear running, it initially switches the running pattern to the CVT running (middle vehicle speed), by generating a command to operate the hub sleeve 54 of the synchromesh mechanism S1 so as to engage the mesh-type clutch D1 that is in a released state. Then, the shift controller 102 makes a downshift through C to C shifting by releasing the clutch C2 for CVT running and engaging the forward clutch C1. This condition is one example of gear running as shown in FIG. 2. Thus, the power transmission pathway in the power transmission system 16 is switched from the first power transmission pathway through which power is transmitted via the CVT 24, to the second power transmission pathway through which power is transmitted via the gear mechanism 28. Thus, when the shift controller 102 switches the power transmission system 16 from power transmission via the CVT 24 to power transmission via the gear mechanism 28 during running of the vehicle 10, it operates the mesh clutch D1 to engage the same clutch D1, and then releases the clutch C2 for CVT running.

With the control for transiently switching the vehicle to the condition of CVT running (middle vehicle speed) as described above, switching between the first power transmission pathway and the second power transmission pathway is accomplished only by giving and receiving torque through C to C shifting. Accordingly, switching shock is suppressed.

As described above, C to C shifting is performed upon switching between the CVT running (in particular, middle vehicle speed) and the gear running, such that the input shaft speed Ni (then, the engine speed Ne) is changed in a stepwise manner in accordance with change of the gear ratio γ. On the other hand, during CVT running, CVT shifting is performed, such that the input shaft speed Ni (then, the engine speed Ne) is kept substantially constant irrespective of the vehicle speed V, or is smoothly changed (namely, continuously changed). Therefore, a difference in the feeling arises between C to C shifting and CVT shifting. Namely, a difference in the shift feeling (driveability) arises between a stepped-speed-change running region in which the C to C shifting is performed, and a stepless-speed-change running region in which the CVT shifting is performed. Accordingly, the driver may feel strange or uncomfortable.

Thus, the shift controller 102 performs CVT shifting as shifting by use of the CVT 24, according to shift characteristics of C to C shifting as shifting realized upon switching between the first power transmission pathway and the second power transmission pathway, or performs C to C shifting according to shift characteristics of CVT shifting. More specifically, the shift controller 102 performs CVT shifting with shift characteristics that match the shift characteristics of C to C shifting, such that the input shaft speed Ni is changed in a stepwise manner (such that the input shaft speed Ni is changed between before and after shifting caused by switching of gear ratio γ in stepped shifting), or performs C to C shifting with shift characteristics that match the shift characteristics of CVT shifting, such that the input shaft speed Ni is continuously changed (such that change of the input shaft speed Ni is suppressed during shifting or the input shaft speed Ni is kept substantially constant). Namely, the shift controller 102 performs one of the C to C shifting and the CVT shifting, according to shift characteristics matching the shift characteristics of the other of the C to C shifting and the CVT shifting.

In C to C shifting, the input shaft speed Ni is changed in a stepwise manner; thus, shift characteristics of CVT shifting when performed according to shift characteristics of the C to C shifting include at least one of a value of the input shaft speed Ni obtained at a point in time at which each shift is started, a shift time required from the start of each shift to completion of the shift, or the amount of change of the input shaft speed Ni over a period from the start of each shift to completion of the shift. Since the shift speed (the rate of change of the input shaft speed Ni) is expressed by the shift time and the amount of change of the input shaft speed Ni, one of the shift time and the amount of change may be replaced by the shift speed (the rate of change of the input shaft speed Ni) during shifting. In the C to C shifting, if the shift line based on which C to C shifting is executed is changed according to the running mode, the value of the input shaft speed Ni at the start of shifting is changed. For example, where the value of the input shaft speed Ni is compared among the sporty mode, normal mode, and the eco-mode, the value of the input shaft speed Ni is set to the highest value when the C to C shifting is performed in the sporty mode, and is set to the lowest value when the C to C shifting is performed in the eco-mode. Also, in the C to C shifting, the shift speed (the rate of change of the input shaft speed Ni) during shifting may be changed. For example, where the shift speed during shifting is compared among the sporty mode, normal mode and the eco-mode, the shift speed is set to the highest speed during C to C shifting in the sporty mode, and is set to the lowest speed during C to C shifting in the eco-mode. If the shift speed during shifting is increased, the shift time is reduced, and/or the amount of change of the input shaft speed Ni is increased. Thus, the shift characteristics of C to C shifting are changed according to the running mode. Therefore, when the shift controller 102 performs CVT shifting according to the shift characteristics of C to C shifting, it changes both the shift characteristics of C to C shifting and the shift characteristics of CVT shifting, in accordance with switching of the running mode.

On the other hand, in the CVT shifting, the input shaft speed Ni is made substantially constant or change of the input shaft speed Ni is suppressed. Accordingly, shift characteristics of C to C shifting when performed according to shift characteristics of CVT shifting include a value of input shaft speed Ni obtained at the time when each shift is started, and the amount of change of the input shaft speed Ni over a period from the start of each shift to completion of the shift.

When the vehicle runs with the accelerator pedal stroke θacc being controlled to a relatively small value (smaller than a given value), the driver is supposed to place a greater emphasis on a demand for improved fuel economy performance than a demand for improved running (power performance). Accordingly, it is desirable to bring the power transmission system 16 as a whole into a condition where the speed ratio is steplessly changed, with the higher priority given to the fuel economy performance of the vehicle 10. On the other hand, when the vehicle runs with the accelerator pedal stroke θacc being controlled to a relatively large value (larger than the given value), the driver is supposed to place a greater emphasis on a demand for improved power performance than a demand for improved fuel economy performance. Accordingly, it is desirable to bring the power transmission system 16 as a whole into a condition where the speed ratio is changed in a stepwise manner, with the higher priority given to the power performance of the vehicle 10.

Thus, the shift controller 102 performs CVT shifting according to shift characteristics of C to C shifting, when the amount of driving request made by the driver is larger than a predetermined value. On the other hand, the shift controller 102 performs C to C shifting according to shift characteristics of CVT shifting, when the amount of driving request made by the driver is equal to or smaller than the predetermined value. The predetermined value is the lower limit (the lowest value) of a predetermined range of large amounts of driving request, within which it is determined that the amount of driving request is large enough to give an assumption that the driver wishes to prioritize running over the fuel economy. Where the amount of driving request is represented by the accelerator pedal stroke θacc, for example, the predetermined value is provided by a large-pedal-stroke threshold value based on which it is determined that the accelerator pedal stroke θacc is large enough to give the above assumption.

The electronic control unit 80 further includes a vehicle condition obtaining unit 104, so as to enable the shift controller 102 as described above to appropriately perform control. The vehicle condition obtaining unit 104 determines whether the engine 12 is in operation, for example, based on the engine output control command signals Se produced by the engine output controller 100, or the engine speed Ne, or the like. If the vehicle condition obtaining unit 104 determines that the engine 12 is in operation, for example, it subsequently determines whether the engine 12 is stopped, based on the engine output control command signals Se produced by the engine output controller 100, or the engine speed Ne, or the like. Also, the vehicle condition obtaining unit 104 determines whether the amount of driving request made by the driver is larger than the predetermined value, for example. More specifically, the vehicle condition obtaining unit 104 determines whether the accelerator pedal stroke θacc is larger than the above-mentioned large-pedal-stroke threshold value.

When the vehicle condition obtaining unit 104 determines that the accelerator pedal stroke θacc is larger than the large-pedal-stroke threshold value, the shift controller 102 performs CVT shifting according to shift characteristics of C to C shifting. On the other hand, when the vehicle condition obtaining unit 104 determines that the accelerator pedal stroke θacc is equal to or smaller than the threshold value, the shift controller 102 performs C to C shifting according to shift characteristics of CVT shifting.

Figure 4:
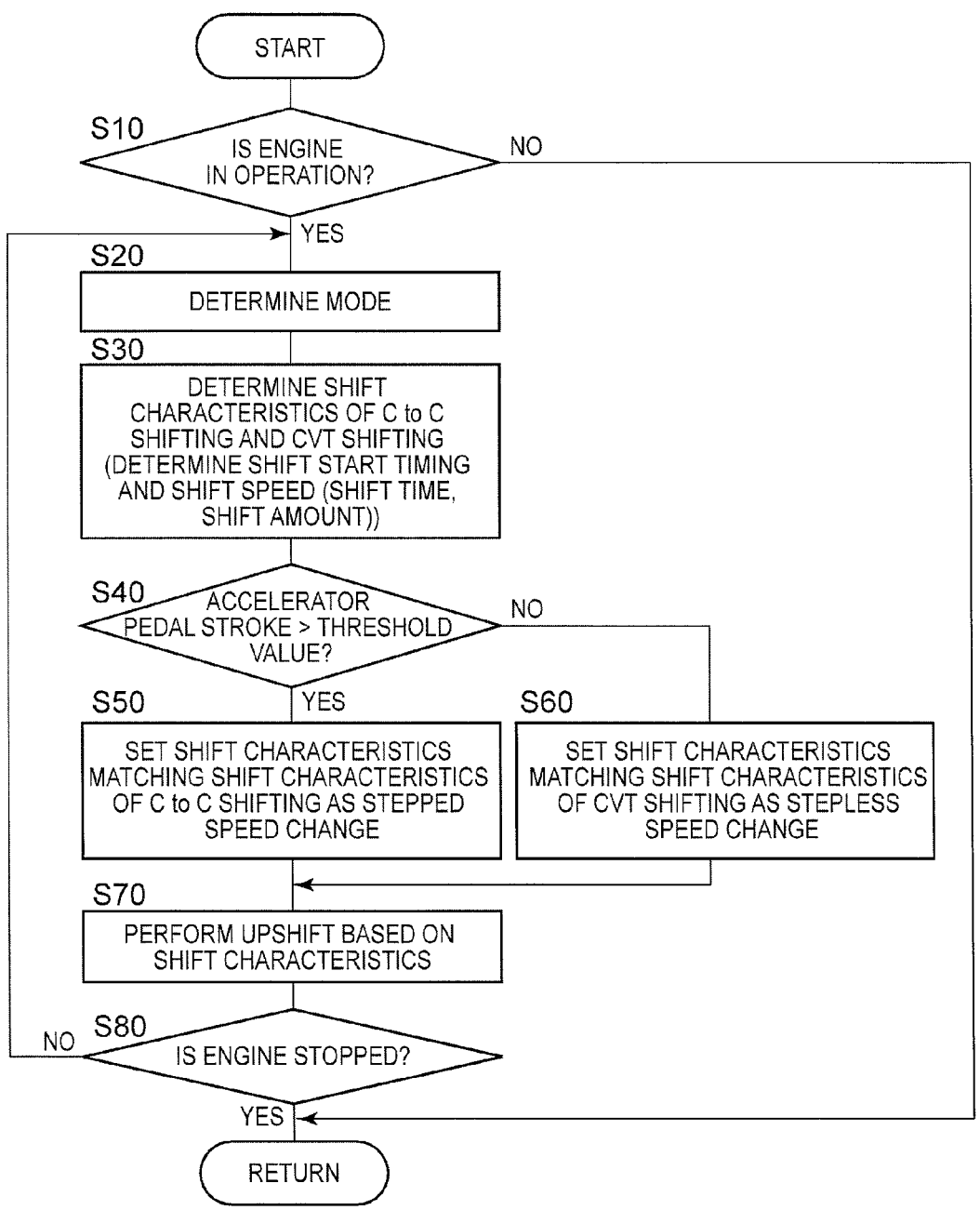
FIG. 4 is a flowchart illustrating a principal part of control operation of an electronic control unit, namely, control operation performed at the time of an upshift for achieving consistent shift feeling throughout the entire running region including a stepped-speed-change running region and a stepless-speed-change running region.
Figure 5:
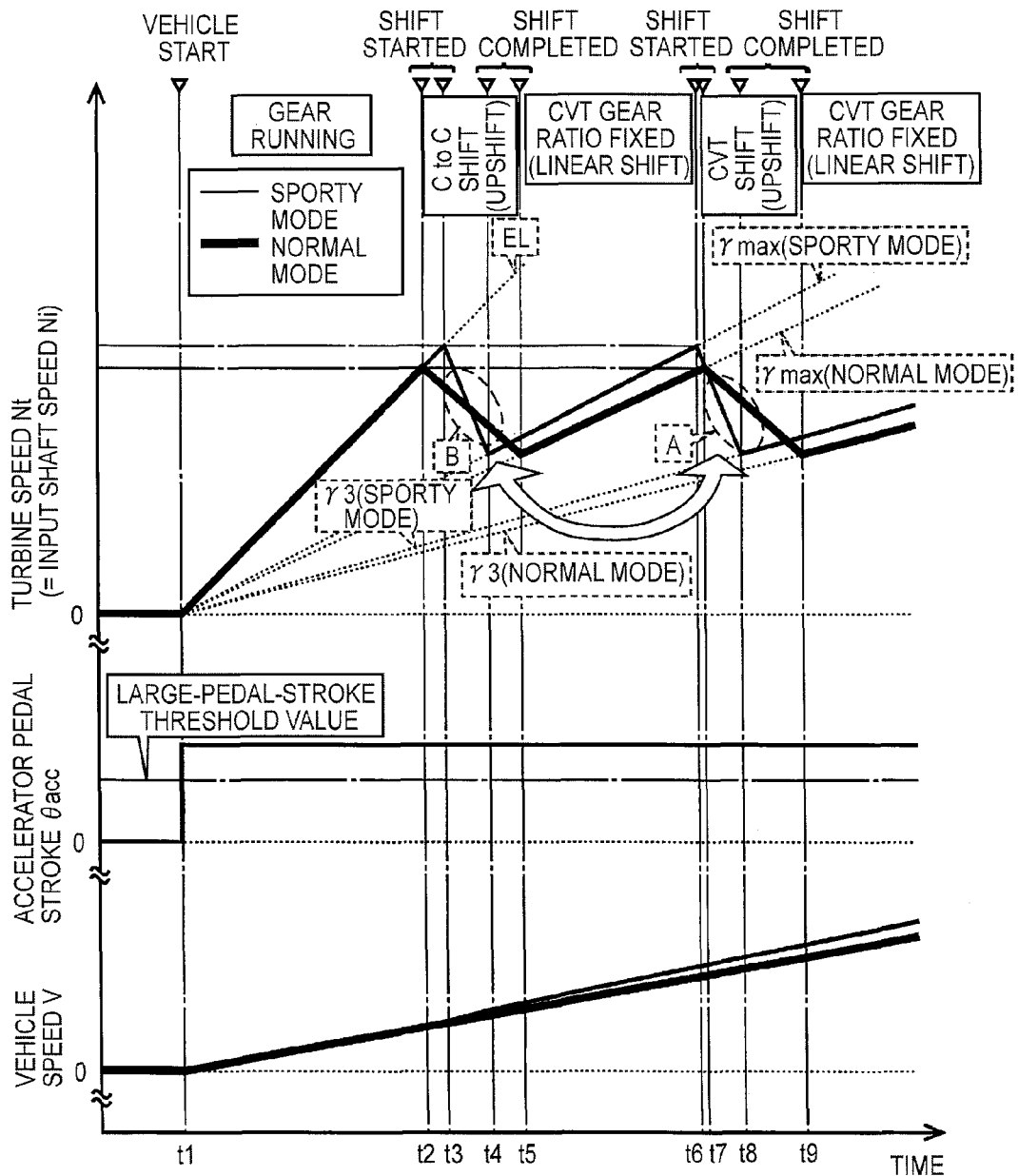
FIG. 5 is a time chart of the case where the control operation illustrated in the flowchart of FIG. 4 is performed, showing one example where the accelerator pedal stroke is relatively large.
Figure 6:
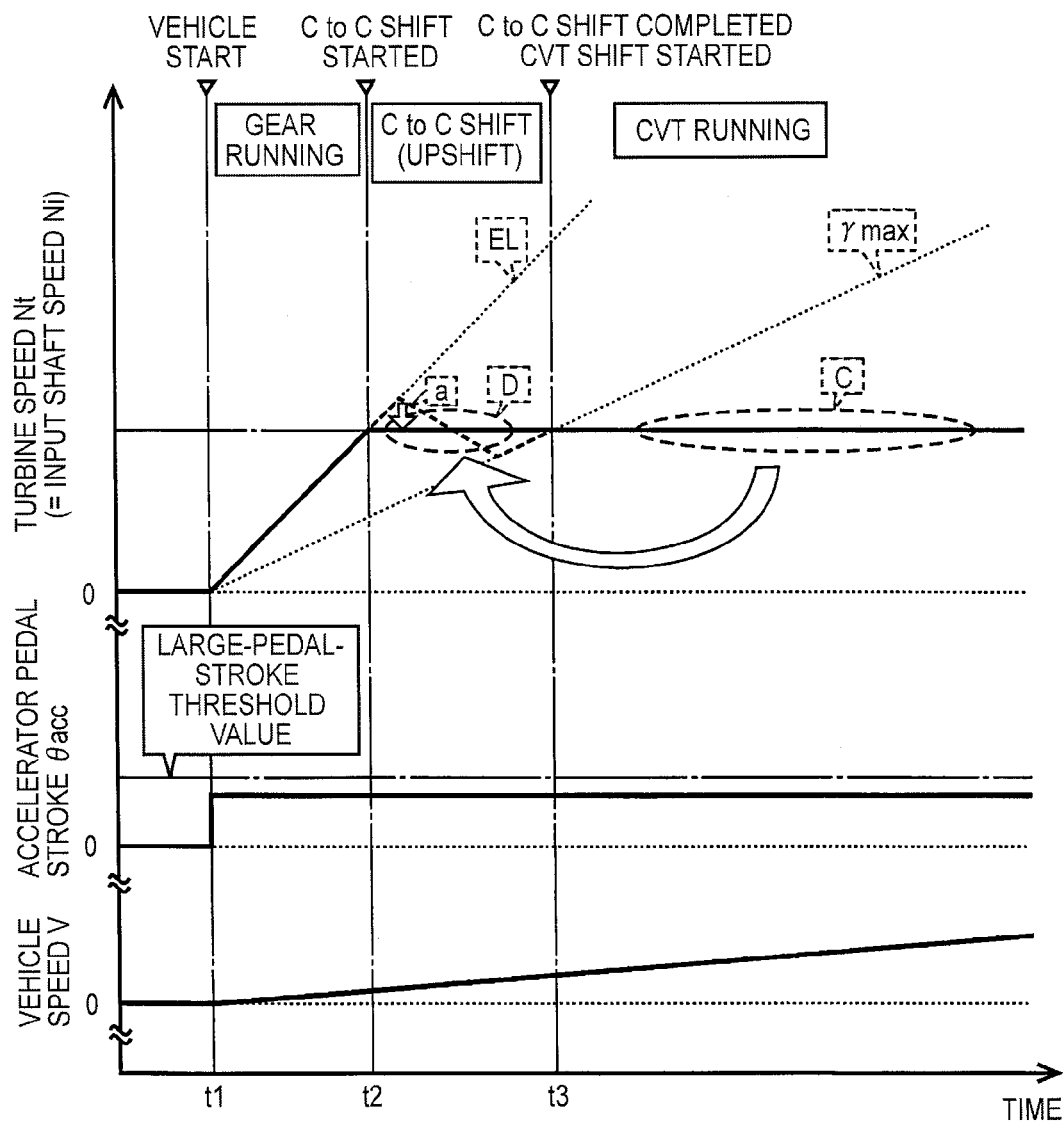
FIG. 6 is a time chart of the case where the control operation illustrated in the flowchart of FIG. 4 is performed, showing one example where the accelerator pedal stroke is relatively small.

FIG. 4 is a flowchart illustrating a principal part of control operation of the electronic control unit 80, namely, control operation for realizing consistent shift feeling through the entire running region including a stepped-speed-change running region and a stepless-speed-change running region. A control routine illustrated in the flowchart of FIG. 4 is repeatedly executed, for example. FIG. 4 is one example of control operation corresponding to an upshift (in particular, power-on upshift). FIG. 5 and FIG. 6 are examples of time charts in the case where the control routine illustrated in the flowchart of FIG. 4 is performed. FIG. 5 shows one example of the case where the accelerator pedal stroke θacc is relatively large, and FIG. 6 shows one example of the case where the accelerator pedal stroke θacc is relatively small.

In FIG. 4, it is initially determined in step S10 corresponding to the vehicle condition obtaining unit 104 whether the engine 12 is in operation, for example. If a negative decision (NO) is obtained in step S10, this routine ends. If an affirmative decision (YES) is obtained in step S10, the running mode selected with the running mode selection switch 70, for example, is determined in step S20 corresponding to the shift controller 102. Then, in step S30 corresponding to the shift controller 102, shift characteristics of C to C shifting in the case where the speed ratio is changed in stages are determined based on the running mode determined in step 20, a given shift line, and so forth. The shift characteristics of C to C shifting include a value of the input shaft speed Ni obtained at the shift start timing or shift starting point, shift speed or shift time, and the shift amount (the amount of change), for example. Also, shift characteristics (e.g., shift start timing, shift amount) of CVT shifting in the case where the speed ratio is steplessly changed are determined based on a given CVT shift map. Then, it is determined in step S40 corresponding to the vehicle condition obtaining unit 104 whether the accelerator pedal stroke θacc is larger than the large-pedal-stroke threshold value. If an affirmative decision (YES) is obtained in step S40, shift characteristics matched with the shift characteristics of C to C shifting in the case where the speed ratio is changed in stages, which are determined in the above step S30, for example, are set in step S50 corresponding to the shift controller 102. On the other hand, when a negative decision (NO) is obtained in step S40, shift characteristics matched with the shift characteristics of CVT shifting in the case where the speed ratio is steplessly changed, which are determined in the above step S30, for example, are set in step S60 corresponding to the shift controller 102. After execution of the above step S50 or S60, in step S70 corresponding to the shift controller 102, an upshift is performed based on the shift characteristics set in the above step S50 or S60, for example in accordance with an increase in the vehicle speed V. Then, it is determined in step S80 corresponding to the vehicle condition obtaining unit 104 whether the engine 12 is stopped, for example. If a negative decision (NO) is obtained in step S80, the control returns to step S20. If an affirmative decision (YES) is obtained in step S80, the routine of FIG. 4 ends.

In FIG. 5, the accelerator pedal is depressed at time t1 when the vehicle is stopped with the accelerator pedal placed in the released state. In FIG. 5, after time t1, the vehicle is started or accelerated after the accelerator pedal is depressed at time t1. In the example of FIG. 5, the accelerator pedal stroke θacc is larger than the large-pedal-stroke threshold value; therefore, the shift characteristics matched with the shift characteristics of C to C shifting in which the speed ratio is changed in stages are set. Accordingly, in both of the C to C shifting (from time t2 to time t5, or from time t3 to time t4) and the following CVT shifting (from time t7 to time t9, or from time t6 to time t8), upshifts are performed such that the input shaft speed Ni is changed in a stepwise manner, as the vehicle speed V increases. Namely, the shift characteristics (the shift start timing, shift time, shift amount) in a portion A circled with a broken line in which the CVT shifting of the stepless-speed-change running region is performed are matched with the shift characteristics of a portion B circled with a broken line in which the C to C shifting of the stepped-speed-change running region is performed. Also, the shift characteristics in the portions A, B circled with broken lines are changed according to the running mode, such that the shift characteristics indicated by a thick solid line indicate those of the normal mode, and the shift characteristics indicated by a thin solid line indicate those of the sporty mode. Also, the shift characteristics in the portions A, B circled with broken lines are changed at the same time, when a target of the power performance, or the like, based on the accelerator pedal stroke θacc, etc., is changed.

In FIG. 6, the accelerator pedal is depressed at time t1 when the vehicle is stopped with the accelerator pedal placed in the released state. In FIG. 6, after time t1, the vehicle is started or accelerated after the accelerator pedal is depressed at time t1. In the example of FIG. 6, the accelerator pedal stroke θacc is equal to or smaller than the large-pedal-stroke threshold value; therefore, shift characteristics matched with the shift characteristics of CVT shifting in which the speed ratio is steplessly or continuously changed are set. Accordingly, in both of the C to C shifting (from time t2 to time t3) and the following CVT shifting (after time t3), upshifts are performed such that the input shaft speed Ni is kept substantially constant, no matter whether the vehicle speed V increases. Namely, the shift characteristics (shift start timing, shift amount) in a portion D circled with a broken line in which the C to C shifting of the stepped-speed-change running region is performed are matched with the shift characteristics of a portion C circled with a broken line in which the CVT shifting of the stepless-speed-change running region is performed. For example, in the C to C shifting in the portion D circled with the broken line, the shift time is set such that change of the input shaft speed Ni in stepped shifting as indicated by a broken line "a" in FIG. 6 does not take place.

As described above, according to this embodiment, in the vehicle 10 in which the CVT 24 and the gear mechanism 28 are provided in parallel on the power transmission pathway between the input shaft 22 and the output shaft 30, the shift controller 102 performs CVT shifting in view of the shift characteristics of C to C shifting in which the speed ratio is changed in stages. Also, the shift controller 102 performs C to C shifting in view of the shift characteristics of CVT shifting in which the speed ratio is steplessly changed. Thus, consistent shift feeling (driveability) can be achieved, throughout the whole running region including the stepped-speed-change running region and the stepless-speed-change running region.

Also, according to this embodiment, the shift controller 102 performs CVT shifting, with the shift characteristics matched with the shift characteristics of C to C shifting, such that the input shaft speed Ni is changed in a stepwise manner. Accordingly, the shift characteristics of C to C shifting in which the speed ratio is changed in stages are substantially identical with the shift characteristics of CVT shifting in which the input shaft speed Ni is changed in a stepwise manner. Thus, consistent shift feeling can be achieved, throughout the entire running region including the stepped-speed-change running region and the stepless-speed-change running region. Also, the shift controller 102 performs C to C shifting, with the shift characteristics matched with the shift characteristics of CVT shifting, such that the input shaft speed Ni is continuously changed. Accordingly, the shift characteristics of CVT shifting in which the speed ratio is steplessly changed are substantially identical with the shift characteristics of the C to C shifting in which the input shaft speed Ni is continuously changed. Thus, consistent shift feeling can be achieved, throughout the entire running region including the stepped-speed-change running region and the stepless-speed-change running region.

According to this embodiment, the shift characteristics of CVT shifting when performed in accordance with the shift characteristics of C to C shifting include at least one of the shift start timing, shift time, and the amount of change of the input shaft speed Ni during shifting. Also, the shift characteristics of C to C shifting when performed in accordance with the shift characteristics of CVT shifting include the shift start timing, and the amount of change of the input shaft speed Ni during shifting. Accordingly, the shift characteristics are matched or controlled to substantially the same characteristics, such that consistent shift feeling can be achieved, throughout the entire running region including the stepped-speed-change running region and the stepless-speed-change running region.

Also, according to this embodiment, the shift controller 102 performs CVT shifting according to the shift characteristics of C to C shifting, when the amount of driving request made by the driver is larger than a predetermined value. Thus, the CVT shifting in which the input shaft speed Ni is changed in a stepwise manner can be performed, only under the situation where the amount of driving request made by the driver is relatively large, and the higher priority is given to running (power performance) than the fuel economy performance. Also, the shift controller 102 performs C to C shifting according to the shift characteristics of CVT shifting, when the amount of driving request made by the driver is equal to or smaller than the predetermined value. Accordingly, the C to C shifting in which the input shaft speed Ni is continuously changed can be performed, under the situation where the amount of driving request made by the driver is relatively small, and the higher priority is given to the fuel economy performance than running (power performance).

Also, according to this embodiment, the shift controller 102 changes both the shift characteristics of C to C shifting and the shift characteristics of CVT shifting, in accordance with switching of the running mode, when the CVT shifting is performed according to the shift characteristics of C to C shifting. Accordingly, consistent shift feeling matching the running mode can be achieved, throughout the entire running region including the stepped-speed-change running region and stepless-speed-change running region.

Next, other embodiments of the invention will be described. In the following description, the same reference numerals are assigned to common portions or elements shared by the embodiments, and these portions or elements will not be described in the following description.

In the above-described first embodiment, the control performed by the shift controller 102 to carry out one of C to C shifting and CVT shifting according to shift characteristics of the other of C to C shifting and CVT shifting has been explained with respect to the example of upshifting. The control as described above may be similarly performed by the shift controller 102 with respect to downshifting as well as upshifting. In the case of downshifting, it is assumed that the vehicle is running with power being transmitted through the CVT; therefore, the vehicle condition obtaining unit 104 determines whether the vehicle is currently running with power being transmitted through the CVT, for example, based on the hydraulic control command signals Scvt, etc. generated by the shift controller 102.

The CVT shifting in the form of a downshift is performed such that the speed ratio is changed in a stepwise manner, similarly to the C to C shifting, in the case where the downshift is a power-on downshift effected when the accelerator pedal stroke θacc is increased. In the case of power-on downshift, it is deemed preferable to cause a power-on downshift (which will be called "CVT downshift") as one type of CVT shifting to be performed when the amount Δθacc of change of the accelerator pedal stroke is equivalent to or greater than the amount Δθacc that causes a power-on downshift (which will be called "C to C downshift") as one type of C to C shifting. Therefore, it is preferable to use the amount of change, rather than the absolute value, as the amount of driving request used to determine whether the CVT downshift is performed as stepless speed change or stepped speed change. In the following, the shift characteristics (in particular, the shift amount E and the shift speed) of C to C downshift as stepwise speed change, and the method of determining the amount of change of the driving request amount which causes a power-on downshift to occur will be described. In this example, the accelerator pedal stroke θacc is used as the amount of driving request, and the amount Δθacc of change of the accelerator pedal stroke represents the amount of change of the driving request amount.

The shift controller 102 determines the shift amount E during a C to C downshift, for example. The shift amount E during the C to C downshift is the amount of change of the input shaft speed Ni which will appear during the C to C downshift, based on the current vehicle speed V and the gear ratio γ (here, γmax and EL), for example. Also, the shift controller 102 determines the shift speed (the rate of change of the speed) during the C to C downshift, based on the shift speed determined in advance according to the running mode, and the currently selected running mode. Also, the shift controller 102 determines the amount Δθacc of change of the accelerator pedal stroke θacc that has to be increased so as to cause the C to C downshift, within a certain period of time for the C to C downshift, as a threshold value G of the amount of change of the accelerator pedal stroke for the C to C downshift, based on a shift line, etc. determined in advance for the C to C downshift, for example. Then, the shift controller 102 sets a threshold value H of the amount of change of the accelerator pedal stroke for determining a CVT downshift, for example, to a value substantially equal to the threshold value G of the amount of change of the accelerator pedal stroke. Also, the shift controller 102 sets the shift amount F during the CVT downshift, to a value substantially equal to the shift amount E during the C to C downshift. The shift amount F during the CVT downshift is, for example, the amount of change of the input shaft speed Ni which appears during the CVT downshift. Further, the shift controller 102 determines whether the amount Δθacc of change of the accelerator pedal stroke within a certain period of time is larger than the threshold value H of the amount of change of the accelerator pedal stroke, during CVT running, for example. If the shift controller 102 determines that the amount Δθacc of change of the accelerator pedal stroke is equal to or smaller than the threshold value H of the amount of change of the accelerator pedal stroke, normal CVT shifting as stepless speed change is performed. On the other hand, if the shift controller 102 determines that the amount Δθacc of change of the accelerator pedal stroke is larger than the threshold value H of the amount of change of the accelerator pedal stroke, it performs a CVT downshift according to shift characteristics equivalent to the shift characteristics during C to C downshift determined as described above. The above-indicated shift characteristics are the shift amount (amount of speed change) F during the CVT downshift, and the shift speed according to the running mode.

Figure 7:
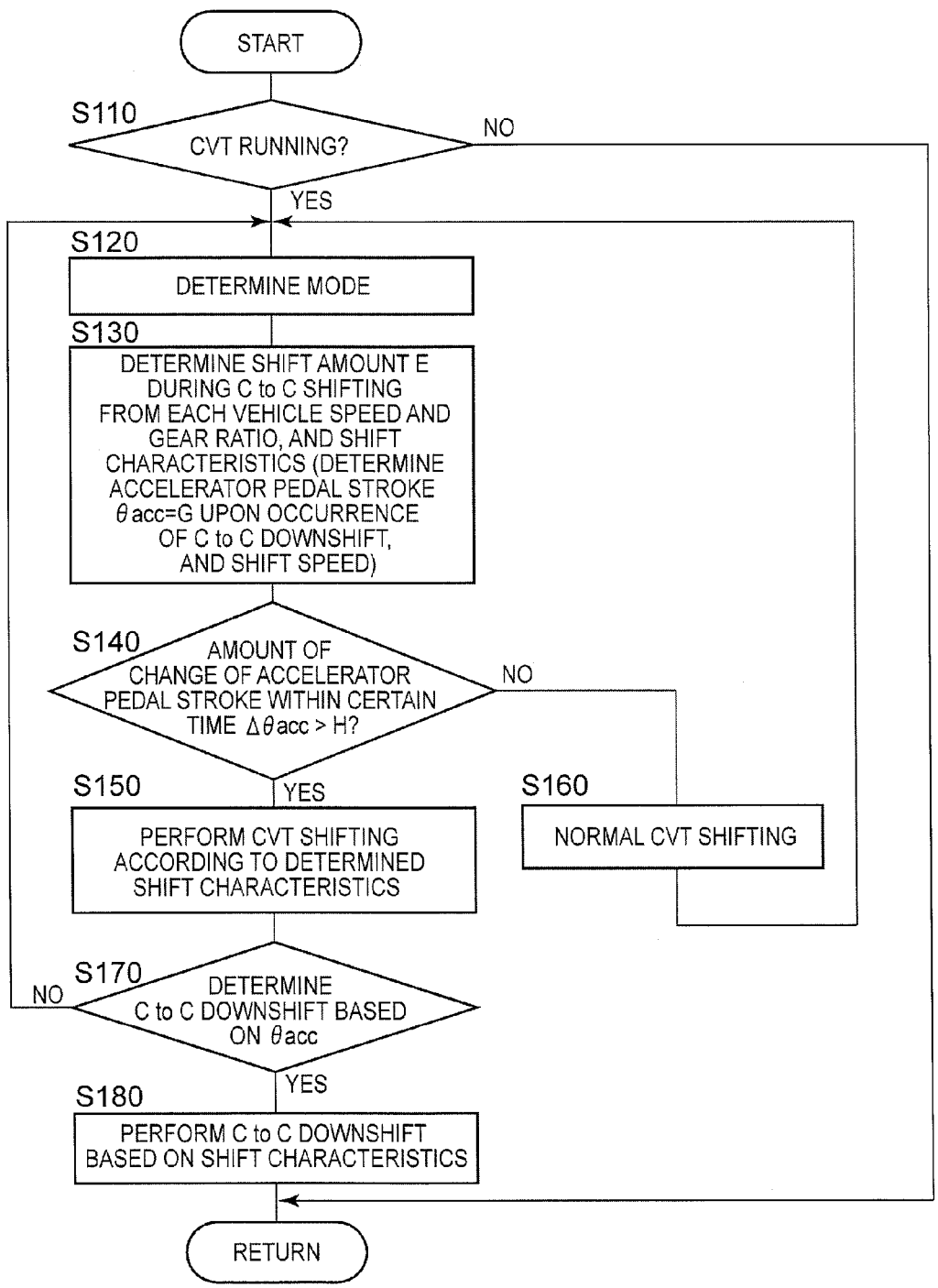
FIG. 7 is a flowchart illustrating a principal part of control operation of the electronic control unit, namely, control operation performed at the time of a downshift for achieving consistent shift feeling throughout the entire running region including a stepped-speed-change running region and a stepless-speed-change running region.
Figure 8:
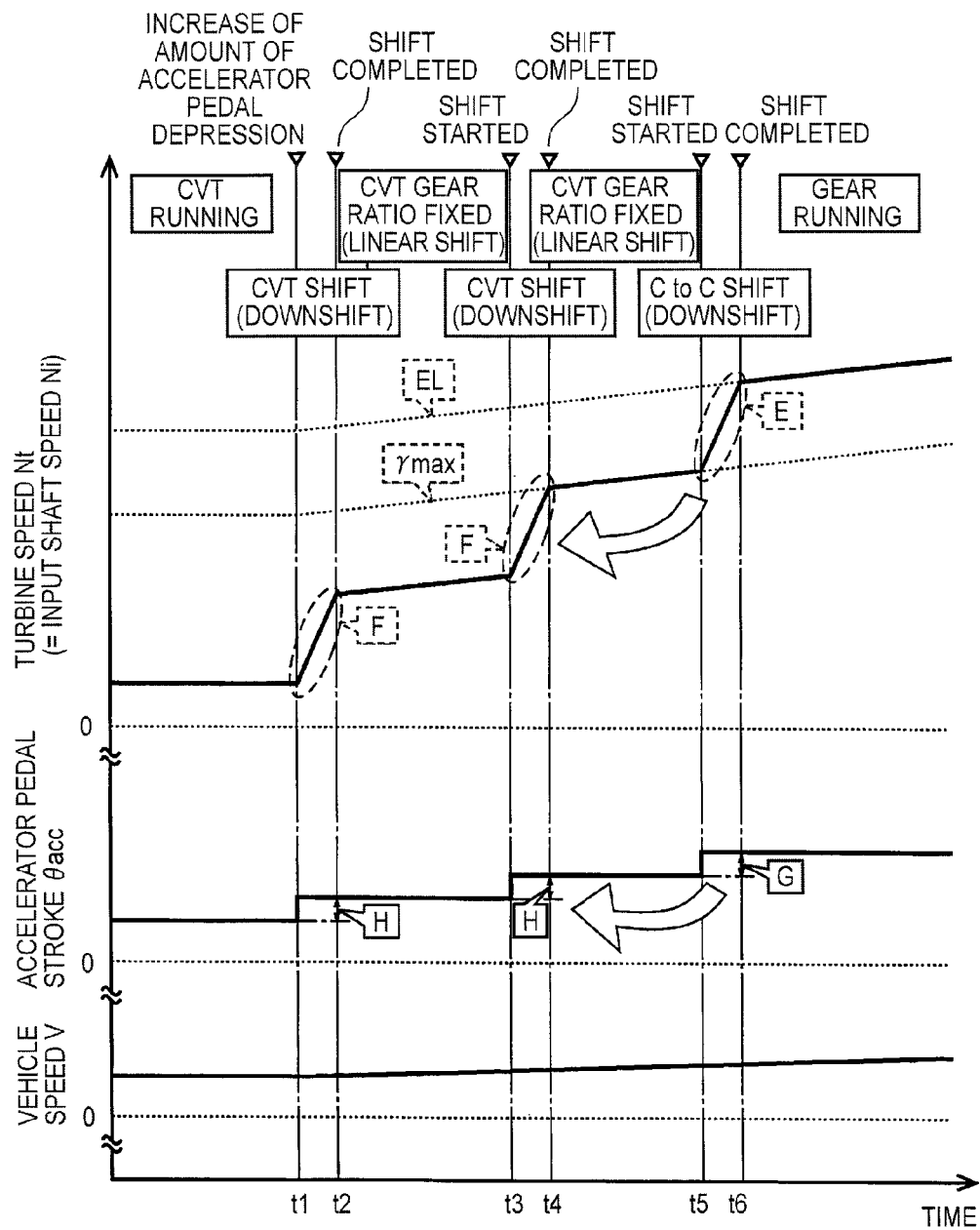
FIG. 8 is a time chart of the case where the control operation illustrated in the flowchart of FIG. 7 is performed, showing one example where CVT downshifts are performed.

FIG. 7 is a flowchart illustrating a principal part of control operation of the electronic control unit 80, namely, control operation for achieving consistent shift feeling through the entire running region including the stepped-speed-change running region and the stepless-speed-change running region. A control routine illustrated in the flowchart of FIG. 7 is repeatedly executed. FIG. 7 is one example of control operation corresponding to downshifts (in particular, power-on downshifts). FIG. 8 is a time chart of the case where the control operation illustrated in the flowchart of FIG. 7 is performed, showing one example in which CVT downshifts are carried out.

In FIG. 7, it is initially determined in step S110 corresponding to the vehicle condition obtaining unit 104 whether the vehicle is running with power being transmitted via the CVT (i.e., whether the vehicle is in the course of CVT running). If a negative decision (NO) is obtained in step S110, this cycle of the routine of FIG. 7 ends. If an affirmative decision (YES) is obtained in step S110, the running mode selected with the running mode selection switch 70, for example, is determined in step S120 corresponding to the shift controller 102. Then, in step S130 corresponding to the shift controller 102, the shift characteristics (e.g., the shift amount E, shift speed during a C to C downshift) of a C to C downshift, and the threshold value G of the amount of change of the accelerator pedal stroke for the C to C downshift, are determined, based on the running mode determined in step S120, given shift lines, vehicle speed V, and the gear ratio γ. Then, in step S140 corresponding to the shift controller 102, it is determined whether the amount Δθacc of change of the accelerator pedal stroke within a certain period of time is larger than the threshold value H of the amount of change of the accelerator pedal stroke which is set to a value substantially equal to the threshold value G of the amount of change of the accelerator pedal stroke. If an affirmative decision (YES) is obtained in step 140, a CVT downshift is performed with shift characteristics (the shift amount F set to a value substantially equal to the shift amount E, the shift speed) that are substantially the same as the shift characteristics during the C to C downshift which were determined in the above step 130, for example. On the other hand, if a negative decision (NO) is obtained in the above step S140, normal CVT shifting as stepless speed change is performed, in step S160 corresponding to the shift controller 102. After executing step S160, the control returns to the above step S120. In step S170 following the above step S150 or the above step S160 and corresponding to the shift controller 102, a C to C downshift is determined based on the accelerator pedal stroke θacc, etc., from a shift line for determining a C to C downshift, for example. If a negative decision (NO) is obtained in step S170, the control returns to the above step S120. If an affirmative decision (YES) is obtained in step S170, the C to C downshift is performed based on the shift characteristics determined in the above step S130, in step S180 corresponding to the shift controller 102.

In FIG. 8, the accelerator pedal is further depressed, i.e., the amount of depression of the accelerator pedal is increased, at time t1 during CVT running. During CVT running before time t1, shift characteristics (e.g., the shift amount E during a C to C downshift, shift speed) of a C to C downshift, and the threshold value G of the amount of change of the accelerator pedal stroke for the C to C downshift, are determined, in preparation for a CVT downshift caused by the increase in the amount of operation of the accelerator pedal. At time t1 and time t3, the amount Δθacc of change of the accelerator pedal stroke is larger than the threshold value H of the amount of change of accelerator pedal stroke which is set to a value substantially equal to the threshold value G of the amount of change of accelerator pedal stroke. Accordingly, a CVT downshift is determined at each of time t1 and time t3. In each of a period between time t1 and time t2 and a period between time t3 and time t4, a CVT downshift is performed with the shift characteristics (the shift amount F set to a value substantially equal to the shift amount E, and the shift speed) which are equivalent to the shift characteristics during the C to C downshift determined as described above. Also, in a period between time t2 and time t3 and a period between time t4 and time t5, the accelerator pedal stroke θacc is kept substantially constant. However, when shifting is performed in a stepwise manner in CVT shifting, normal CVT shifting is not performed but shifting is performed while gear ratio γ is fixed. Further, at time t5, the accelerator pedal stroke θacc exceeds a shift line for determining a C to C downshift; therefore, a C to C downshift is determined. Thus, in a period between time t5 and time t6, the C to C downshift is performed with the determined shift characteristics (the shift amount E, the shift speed) during the C to C downshift. After time t6, the vehicle runs with power being transmitted via the gear mechanism.

As described above, according to this embodiment, in the vehicle 10 in which the CVT 24 and the gear mechanism 28 are provided in parallel on a power transmission pathway between the input shaft 22 and the output shaft 30, the shift controller 102 performs CVT shifting, in view of the shift characteristics of C to C shifting as stepped speed change. Also, the shift controller 102 performs C to C shifting, in view of the shift characteristics of CVT shifting as stepless speed change. Thus, substantially the same effect as that of the above-described first embodiment is obtained.

In the control performed by the shift controller 102 in the above-described first embodiment to perform CVT shifting according to shift characteristics of C to C shifting, the shift start timing, shift time, and the shift amount are set as examples of the shift characteristics. These shift characteristics specify the manner of changing the input shaft speed Ni during each shift, for example. In place of these characteristics, the manner of changing the input shaft speed Ni in each shift may be specified by a time interval between a point in time at which a shift is started to a point in time at which the next shift is started. Namely, the shift characteristics of CVT shifting when performed according to the shift characteristics of C to C shifting may include the time interval between the time when the shift is started to the time when the next shift is started. The time interval is a shift tempo (shift interval) in shifting performed throughout the entire running region including a stepped-speed-change running region and a stepless-speed-change running region. The shift controller 102 performs C to C shifting and CVT shifting, according to the shift characteristics including the matched shift tempo. Also, during a power-on period, the above-indicated time interval provides an acceleration time J used when the vehicle speed V is increased. It is desirable to reduce the time interval as the accelerator pedal stroke θacc or the amount Δθacc of change of the accelerator pedal stroke during the power-on period is larger. The shift controller 102 sets the acceleration time J, based on the accelerator pedal stroke θacc, or the like, from a predetermined relationship for setting the acceleration time J, for example. Once the acceleration time J is set, the shift controller 102 determines other shift characteristics (the shift start timing, shift time, and the shift amount) according to the acceleration time J. By the way, in a configuration that C to C shifting is performed only once such as the vehicle 10 of this embodiment, shifting following to C to C shifting is CVT shifting and a first acceleration time J is achieved by the CVT shifting. Thus, in a configuration that C to C shifting is performed only once, CVT shifting is to be performed such that shift tempo matches when CVT shifting is performed in a stepwise manner.

Figure 9:
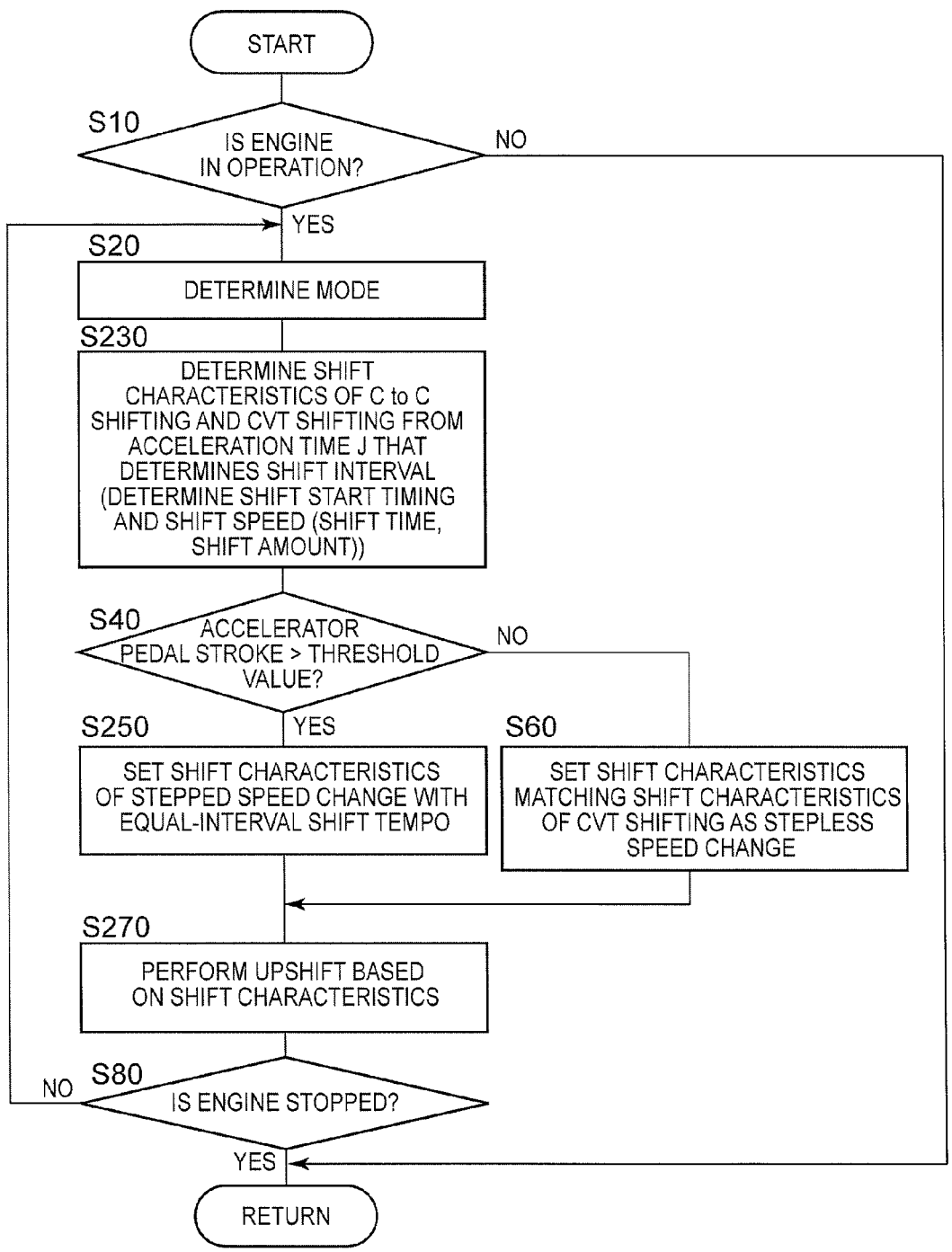
FIG. 9 is a flowchart illustrating a principal part of control operation of the electronic control unit, namely, control operation performed at the time of an upshift different from that of FIG. 4 for achieving consistent shift feeling throughout the entire running region including a stepped-speed-change running region and a stepless-speed-change running region.
Figure 10:
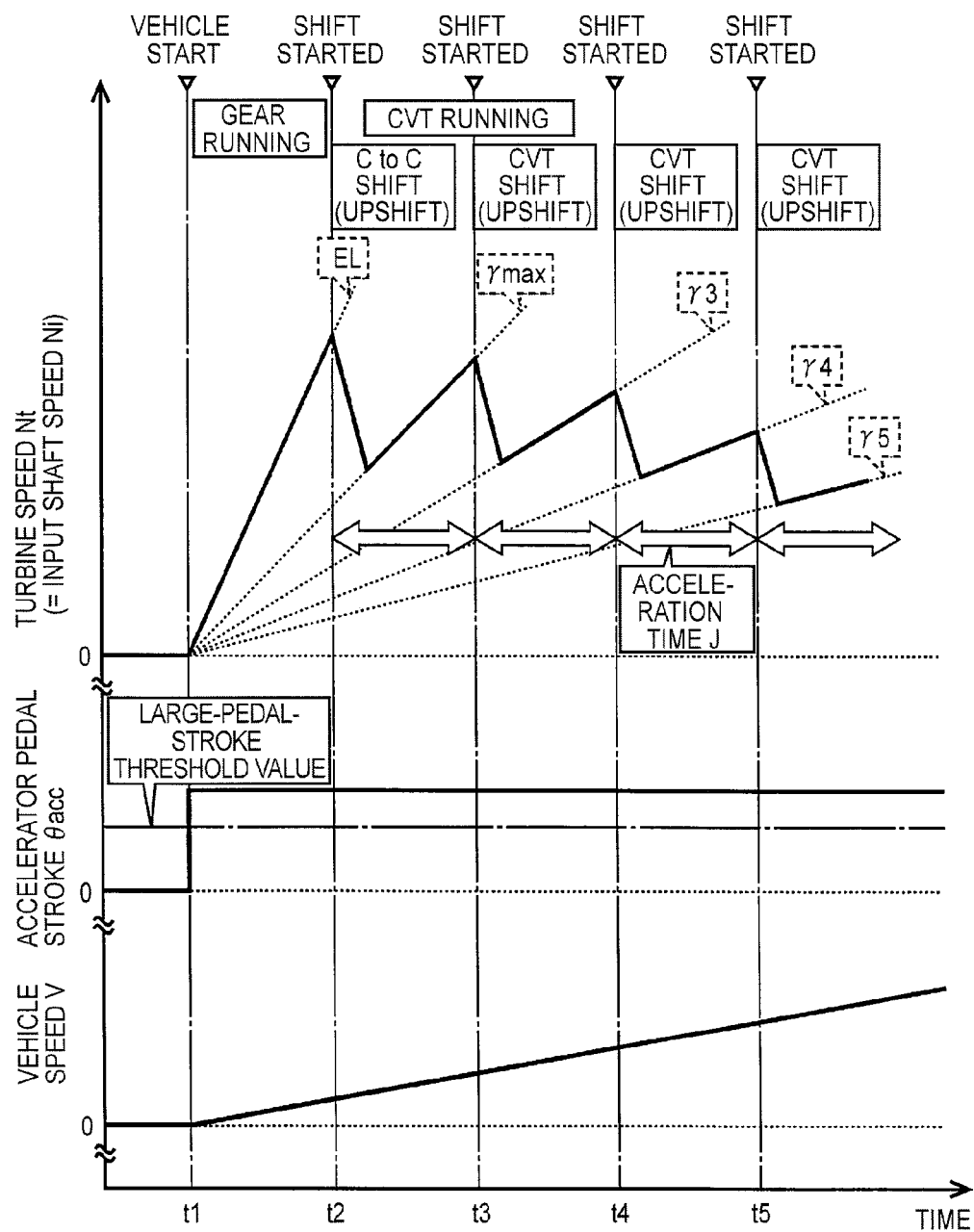
FIG. 10 is a time chart of the case where the control operation illustrated in the flowchart of FIG. 9 is performed, showing one example where the accelerator pedal stroke is relatively large.

FIG. 9 is a flowchart illustrating a principal part of control operation of the electronic control unit 80, namely, control operation for achieving consistent shift feeling throughout the entire running region including a stepped-speed-change running region and a stepless-speed-change running region. A control routine illustrated in the flowchart of FIG. 9 is repeatedly executed, for example. FIG. 9 shows one example of control operation corresponding to an upshift (in particular, power-on upshift). FIG. 10 is a time chart of the case where the control operation shown in the flowchart of FIG. 9 is performed, showing one example in which the accelerator pedal stroke θacc is relatively large. The embodiment of FIG. 9 is different from that of FIG. 4, and differences from the embodiment of FIG. 4 will be mainly described.

In FIG. 9, step S20 is followed by step S230 corresponding to the shift controller 102, in which the acceleration time J that determines the shift interval is set, for example. In step S230 corresponding to the shift controller 102, shift characteristics (the shift start timing, shift time, and the shift amount) in the case where the speed ratio is changed in stages are determined according to the acceleration time J. Also, shift characteristics (e.g., the shift start timing, the shift amount) of CVT shifting in the case where the speed ratio is steplessly changed are determined based on a given CVT shift map, etc. Then, in step S40 corresponding to the vehicle condition obtaining unit 104, it is determined whether the accelerator pedal stroke θacc is larger than a large-pedal-stroke threshold value, for example. If an affirmative decision (YES) is obtained in step S40, the shift characteristics in the case where the speed ratio is changed in stages at equal intervals (equal-interval shift tempo), which are determined in the above step S230, for example, are set in step S250 corresponding to the shift controller 102. If, on the other hand, a negative decision (NO) is obtained in step S40, shift characteristics that are matched with the shift characteristics of CVT shifting in the case where the speed ratio is steplessly changed, which are determined in the above step S230, for example, are set in step S60 corresponding to the shift controller 102. The above step S250 or step S60 is followed by step S270 corresponding to the shift controller 102, an upshift based on the shift characteristics set in the above step S250 or the above step S60 is carried out. Then, in step S80 corresponding to the vehicle condition obtaining unit 104, it is determined whether the engine 12 is stopped, for example.

In FIG. 10, the accelerator pedal is depressed at time t1 when the vehicle is stopped with the accelerator pedal placed in the released state. Also, in FIG. 10, after time t1 at which the accelerator pedal is depressed, the vehicle is started or accelerated. In this example, the accelerator pedal stroke θacc is larger than a large-pedal-stroke threshold value; therefore, shift characteristics matched with the shift characteristics of C to C shifting in which the speed ratio is changed in stages are set. In both of the C to C shifting that starts at time t2 (shift start timing) and the CVT shifting that starts at time t3, time t4, and time t5 (shift start timing), upshifts are carried out such that the input shaft speed Ni changes in a stepwise manner as the vehicle speed V increases. Namely, the C to C shifting in the stepped-speed-change running region and the CVT shifting in the stepless-speed-change running region are performed in the form of successive changes in the speed ratio with substantially the same acceleration time J (namely, the speed ratio is changed at substantially the same shift tempo). Here, only CVT shifting is available because C to C shifting is performed only once. Although not shown in the drawings, the acceleration time J set by the shift controller 102 may be changed according to a target of power performance, etc. based on the running mode, the accelerator pedal stroke θacc, etc. For example, when the target is changed, each acceleration time J is changed at the same time.

As described above, according to this embodiment, substantially the same effect as that of the above-described first embodiment can be obtained. In addition, the shift characteristics of CVT shifting when performed according to the shift characteristics of C to C shifting include the time interval between the time when the shift is started and the time when the next shift is started. Accordingly, the speed ratio is successively changed at substantially the same shift tempo, throughout the entire running region including the stepped-speed-change running region and the stepless-speed-change running region. With the shift tempo thus controlled to be equal, consistent shift feeling (for example, rhythmical change of the engine speed with change in the speed ratio) can be achieved.

While some embodiments of the invention have been described in detail with reference to the drawings, the invention may be applied in other forms.

In the above-described embodiments, control operation of each embodiment is carried out independently. However, control operation of each of the above-described embodiments need not be performed independently, but control operations of two or more of the embodiments may be combined as appropriate and carried out. More specifically, the control operation corresponding to an upshift illustrated in the above-described first embodiment and the control operation corresponding to a downshift illustrated in the above-described second embodiment may be implemented in one vehicle 10. Also, the control operation in which substantially the same shift tempo is employed, as illustrated in the above-described third embodiment, may be applied to the control operation corresponding to downshifts illustrated in the above-described second embodiment. For example, referring to the time chart of FIG. 8, when the accelerator pedal is depressed at a time by the amount Δθacc of change of the accelerator pedal stroke which is the sum of the three increases in the accelerator pedal stroke, three downshifts may be executed at the shift tempo controlled to be substantially equal.

In the above-described embodiments, the gear mechanism 28 is a power transmission mechanism in which one gear position is formed. However, the invention is not limited to this arrangement. For example, the gear mechanism 28 may be a power transmission mechanism in which two or more gear positions having different gear ratios are formed. Namely, the gear mechanism 28 may be a transmission having two or more gear positions, in which the gear ratio is changed in two or more stages. Where the gear mechanism 28 is a power transmission mechanism in which two or more gear positions are formed, the gear ratio is changed in stages by the gear mechanism 28 itself. Therefore, the shift controller 102 performs CVT shifting according to shift characteristics (in particular, stepped speed change) performed by the gear mechanism 28, or performs shifting by the gear mechanism 28 according to shift characteristics of CVT shifting (in particular, stepless speed change by the CVT 24). More specifically, the shift controller 102 performs CVT shifting with shift characteristics matched with the shift characteristics by the gear mechanism 28, so that the input shaft speed Ni is changed in a stepwise manner. Alternatively, the shift controller 102 performs shifting by the gear mechanism 28, with shift characteristics matched with the shift characteristics of CVT shifting, so that the input shaft speed Ni is continuously changed. Namely, the shift controller 102 performs one of the shifting by the gear mechanism 28 and the CVT shifting, according to shift characteristics matched with the shift characteristics of the other of the shifting by the gear mechanism 28 and the CVT shifting. Also, when the shift controller 102 performs CVT shifting according to the shift characteristics by the gear mechanism 28, it changes both the shift characteristics of the shifting by the gear mechanism 28 and the shift characteristics of the CVT shifting, in accordance with switching of the running mode. Also, the shift controller 102 performs CVT shifting according to the shift characteristics by the gear mechanism 28, when the amount of driving request made by the driver is larger than a predetermined value, and performs shifting by the gear mechanism 28 according to the shift characteristics of CVT shifting, when the amount of driving request made by the driver is equal to or smaller than the predetermined value. In this manner, too, substantially the same effects as those of the above-described first to third embodiments can be obtained.

In the above-described embodiments, the gear mechanism 28 is a power transmission mechanism that forms the gear ratio EL that is lower than the lowest gear ratio γmax of the CVT 24, from the viewpoint of the gear ratio γ. However, the invention is not limited to this arrangement. For example, the gear mechanism 28 may be a power transmission mechanism that forms a gear ratio EH that is higher than the highest gear ratio γmin of the CVT 24. Also, the gear mechanism 28 may be a power transmission mechanism that forms the gear ratio EL on the low gear side and the gear ratio EH on the high gear side. Even with the gear mechanism 28 modified as described above, the invention may be applied. This is also true with the case where the gear mechanism 28 is a power transmission mechanism in which two or more gear positions are formed.

In the above-described embodiments, the vehicle 10 has the normal mode, sporty mode, and the eco-mode, as the running modes. However, the invention is not limitedly applied to this type of vehicle. For example, the vehicle 10 may have the normal mode and the sporty mode (or eco-mode), as the running modes. The vehicle 10 may further have a different running mode, such as an intermediate running mode between the normal mode and the eco-mode. An example of the manner of switching the pattern of change of the input shaft speed Ni when the running mode is changed between the normal mode and the sporty mode is illustrated in FIG. 5. However, the pattern of change of the input shaft speed Ni may be similarly changed when the running mode is changed to another running mode. For example, referring to the time chart of FIG. 5, the input shaft speed Ni at the shift start timing is set to a lower value in the eco-mode, as compared with that in the normal mode. Also, in the eco-mode, the shift speed (or rate of speed change) is reduced (i.e., the input shaft speed Ni is changed more slowly or at a lower rate), as compared with that in the normal mode. The switching of the pattern of change of the input shaft speed Ni when the running mode is changed as described above may be applied to each of the embodiments as indicated in the time charts of FIG. 8 and FIG. 10. While each running mode is selected with the running mode selection switch 70, the invention is not limited to this arrangement. For example, where the vehicle 10 has an automatic shift range (D range) and a manual shift range (M range, S range), for example, the running mode may be switched between the normal mode and the sporty mode, in association with switching between the D range and the S range. Also, the running mode may be switched between the sporty mode and the normal mode, according to the magnitude of the accelerator pedal stroke θacc.

In this connection, the vehicle 10 is not necessarily required to have two or more types of running modes, except for the case where the shift controller 102 performs control for changing the shift characteristics of C to C shifting and the shift characteristics of CVT shifting, in accordance with switching of the running mode, when CVT shifting is performed according to the shift characteristics of C to C shifting. For example, when the vehicle 10 does not have the two or more types of running modes, step S20 in the flowcharts of FIGS. 4 and 9 and step S120 in the flowchart of FIG. 7 are not executed. Therefore, step S20 may be eliminated in the flowcharts of FIGS. 4 and 9, and step S120 may be eliminated in the flowchart of FIG. 7. Thus, steps in each control routine may be changed as needed unless the change causes any problem. In another example in which the control routine may be changed as needed, in the flowchart of FIG. 4, for example, step S50 may be executed when an affirmative decision (YES) is obtained in step S40, and this routine may be finished when a negative decision (NO) is obtained in step S40. In a further example, in the flowchart of FIG. 4, this routine may be finished when an affirmative decision (YES) is made in step S40, and step S60 may be executed when a negative decision (NO) is obtained in step S40. Namely, steps S50 and S60 in the flowchart of FIG. 4 are not necessarily required to be provided. If one of these steps S50 and S60 is executed irrespective of the accelerator pedal stroke θacc, step S40 is not necessarily required to be provided in the flowchart of FIG. 4.

In the embodiments illustrated in the time charts of FIGS. 5, 6, and 10, when the accelerator pedal is depressed while the vehicle is stopped with the accelerator pedal placed in the released state, the vehicle is started or accelerated. However, the invention may also be applied to an embodiment in which the vehicle speed V increases when the accelerator pedal is depressed during gear running, for example, and an upshift is performed.

In the above-described embodiment illustrated in the time chart of FIG. 8, three downshifts are performed in response to three increases in the amount of depression of the accelerator pedal. However, if the amount of depression of the accelerator pedal is increased only once, a downshift may be performed in response to the increase in the amount of depression of the accelerator pedal. Also, if the accelerator pedal is depressed at a time by the amount Δθacc of change of the accelerator pedal stroke which is the sum of the above-indicated three increases in the amount of depression of the accelerator pedal, a downshift may be performed once to provide a shift amount (=E+F+F) as the sum of the amounts of speed change corresponding to the three downshifts. This invention may also be applied to the thus modified example.

In the above-described embodiments, the belt-type continuously variable transmission 24 is illustrated as a stepless speed change mechanism, and the clutch C2 for CVT running is provided closer to the drive wheels 14 than the CVT 24 (namely, between the secondary pulley 62 and the output shaft 30). However, the stepless speed change mechanism may be a toroidal type continuously variable transmission, for example. Also, the clutch C2 for CVT running may be provided closer to the engine 12 than the CVT 24 (namely, between the primary pulley 58 and the input shaft 22).

In the above-described embodiments, the running pattern of the power transmission system 16 is selected using a predetermined shift map. However, this invention is not limited to this arrangement. For example, the running pattern of the power transmission system 16 may be selected by calculating the amount of driving request (e.g., required torque) made by the driver, based on the vehicle speed V and the accelerator pedal stroke θacc, and setting the gear ratio that can meet the required torque.

While the hub sleeve 54 is operated by the hydraulic actuator in the illustrated embodiments, the invention is not limited to this arrangement. For example, the hub sleeve 54 may be operated by an electric motor. While the hub sleeve 54 is normally engaged with the first gear 50 in the mesh-type clutch D1, the invention is not limited to this arrangement. For example, the mesh-type clutch D1 may be configured such that the hub sleeve 54 is normally engaged with the second gear 52.

In the illustrated embodiments, the stepless speed change mechanism is preferably a known belt-type continuously variable transmission. However, another type of continuously variable transmission, such as a known traction type continuously variable transmission, may be employed. The above-mentioned power transmission mechanism is a mesh-type gear mechanism in which a single gear position or two or more gear positions having different gear ratios is/are formed. The gear ratio(s) formed by the power transmission mechanism is/are a gear ratio at a lower vehicle speed side than the lowest-vehicle-speed-side gear ratio formed by the stepless speed change mechanism, and/or a gear ratio at a higher vehicle speed side than the highest-vehicle-speed-side gear ratio formed by the stepless speed change mechanism. The clutch mechanism includes the first clutch mechanism that permits and inhibits power transmission through the first power transmission pathway, and the second clutch mechanism that permits and inhibits power transmission through the second power transmission pathway. The first clutch mechanism and the second clutch mechanism are both known hydraulic or electromagnetic friction clutches. While an internal combustion engine, such as a gasoline engine or a diesel engine, is used as the driving power source, another prime mover, such as an electric motor, may be used alone, or may be used in combination with the engine. The power of the driving power source is transmitted to the stepless speed change mechanism and the power transmission mechanism, via the hydraulic transmission device. Also, the vehicle includes the known forward-reverse switching device provided between the input rotary member and the output rotary member, in parallel with the stepless speed change mechanism and in series with the power transmission mechanism. The second clutch mechanism is one of elements that constitute the forward-reverse switching device.

It is to be understood that the above-described embodiments are merely exemplary embodiments, and that the invention may be otherwise embodied with various changes or modifications, based on the knowledge of those skilled in the art.

What is claimed is:

1. A control system for a vehicle, the control system comprising:
a driving power source;
an input rotary member configured to transmit power of the driving power source;
at least one drive wheel; a stepless speed change mechanism provided on a first power transmission pathway, the first power transmission pathway being defined between the driving power source and the drive wheel;
a power transmission mechanism including at least one gear position, the power transmission mechanism being provided on a second power transmission pathway, the second power transmission pathway being defined between the driving power source and the drive wheel;
an output rotary member configured to deliver the power to the drive wheel, the stepless speed change mechanism and the power transmission mechanism being provided in parallel on a power transmission pathway between the input rotary member and the output rotary member;
a clutch mechanism configured to switch the power transmission pathway between the first power transmission pathway and the second power transmission pathway; and
an electronic control unit configured to perform a shift in the stepless speed change mechanism so as to change a rotational speed of the input rotary member in a stepwise manner, according to shift characteristics of a shift performed in the power transmission mechanism, or according to shift characteristics of a shift realized by switching between the first power transmission pathway and the second power transmission pathway, the shift characteristics including a value of the rotational speed of the input rotary member obtained at a point in time at which the shift is started.

2. The control system according to claim 1, wherein the electronic control unit is configured to perform a shift in the stepless speed change mechanism, according to the shift characteristics of the shift performed in the power transmission mechanism or according to the shift characteristics of the shift realized by switching between the first power transmission pathway and the second power transmission pathway, when an amount of driving request made by a driver is larger than a predetermined value.

3. The control system according to claim 1, wherein:
the vehicle has a plurality of running modes; and
the electronic control unit is configured to (i) change both the shift characteristics of the shift performed in the power transmission mechanism, and the shift characteristics of the shift performed in the stepless speed change mechanism, or (ii) change both the shift characteristics of the shift realized by switching between the first power transmission pathway and the second power transmission pathway, and speed change characteristics of the shift performed in the stepless speed change mechanism, in accordance with switching of running modes.

4. A control system for a vehicle, the control system comprising:
a driving power source;
an input rotary member configured to transmit power of the driving power source;
at least one drive wheel; a stepless speed change mechanism provided on a first power transmission pathway, the first power transmission pathway being defined between the driving power source and the drive wheel;
a power transmission mechanism including at least one gear position, the power transmission mechanism being provided on a second power transmission pathway, the second power transmission pathway being defined between the driving power source and the drive wheel;
an output rotary member configured to deliver the power to the drive wheel, the stepless speed change mechanism and the power transmission mechanism being provided in parallel on a power transmission pathway between the input rotary member and the output rotary member;
a clutch mechanism configured to switch the power transmission pathway between the first power transmission pathway and the second power transmission pathway; and
an electronic control unit configured to perform a shift in the stepless speed change mechanism so as to change a rotational speed of the input rotary member in a stepwise manner, according to shift characteristics of a shift performed in the power transmission mechanism, or according to shift characteristics of a shift realized by switching between the first power transmission pathway and the second power transmission pathway,
the shift characteristics including a shift time required from start of the shift to completion of the shift.

5. The control system according to claim 4, wherein the electronic control unit is configured to perform a shift in the stepless speed change mechanism, according to the shift characteristics of the shift performed in the power transmission mechanism or according to the shift characteristics of the shift realized by switching between the first power transmission pathway and the second power transmission pathway, when an amount of driving request made by a driver is larger than a predetermined value.

6. The control system according to claim 4, wherein:
the vehicle has a plurality of running modes; and
the electronic control unit is configured to (i) change both the shift characteristics of the shift performed in the power transmission mechanism, and the shift characteristics of the shift performed in the stepless speed change mechanism, or (ii) change both the shift characteristics of the shift realized by switching between the first power transmission pathway and the second power transmission pathway, and speed change characteristics of the shift performed in the stepless speed change mechanism, in accordance with switching of running modes.

7. A control system for a vehicle, the control system comprising:
a driving power source;
an input rotary member configured to transmit power of the driving power source;
at least one drive wheel; a stepless speed change mechanism provided on a first power transmission pathway, the first power transmission pathway being defined between the driving power source and the drive wheel;
a power transmission mechanism including at least one gear position, the power transmission mechanism being provided on a second power transmission pathway, the second power transmission pathway being defined between the driving power source and the drive wheel;
an output rotary member configured to deliver the power to the drive wheel, the stepless speed change mechanism and the power transmission mechanism being provided in parallel on a power transmission pathway between the input rotary member and the output rotary member;

a clutch mechanism configured to switch the power transmission pathway between the first power transmission pathway and the second power transmission pathway; and an electronic control unit configured to perform a shift in the stepless speed change mechanism so as to change a rotational speed of the input rotary member in a stepwise manner, according to shift characteristics of a shift performed in the power transmission mechanism, or according to shift characteristics of a shift realized by switching between the first power transmission pathway and the second power transmission pathway, the shift characteristics including an amount of change of the rotational speed of the input rotary member, over a period between start of the shift and completion of the shift.

8. The control system according to claim 7, wherein the electronic control unit is configured to perform a shift in the stepless speed change mechanism, according to the shift characteristics of the shift performed in the power transmission mechanism or according to the shift characteristics of the shift realized by switching between the first power transmission pathway and the second power transmission pathway, when an amount of driving request made by a driver is larger than a predetermined value.

9. The control system according to claim 7, wherein:

the vehicle has a plurality of running modes; and the electronic control unit is configured to (i) change both the shift characteristics of the shift performed in the power transmission mechanism, and the shift characteristics of the shift performed in the stepless speed change mechanism, or (ii) change both the shift characteristics of the shift realized by switching between the first power transmission pathway and the second power transmission pathway, and speed change characteristics of the shift performed in the stepless speed change mechanism, in accordance with switching of running modes.

10. A control system for a vehicle, the control system comprising:

a driving power source;

an input rotary member configured to transmit power of the driving power source;

at least one drive wheel;

a stepless speed change mechanism provided on a first power transmission pathway, the first power transmission pathway being defined between the driving power source and the drive wheel;

a power transmission mechanism including at least one gear position, the power transmission mechanism being provided on a second power transmission pathway, the second power transmission pathway being defined between the driving power source and the drive wheel;

an output rotary member configured to deliver the power to the drive wheel, the stepless speed change mechanism and the power transmission mechanism being provided in parallel on a power transmission pathway between the input rotary member and the output rotary member;

a clutch mechanism configured to switch the power transmission pathway between the first power transmission pathway and the second power transmission pathway; and an electronic control unit configured to perform (i) a shift in the power transmission mechanism, or (ii) a shift realized by switching between the first power transmission pathway and the second power transmission pathway, such that a rotational speed of the input rotary member is continuously changed according to shift characteristics matched with shift characteristics of a shift performed in the stepless speed change mechanism, the shift characteristics including a value of the rotational speed of the input rotary member obtained at a point in time at which the shift is started, and an amount of change of the rotational speed of the input rotary member over a period from start of the shift to completion of the shift.

11. The control system according to claim 10, wherein the electronic control unit is configured to perform (i) a shift in the power transmission mechanism, or (ii) a shift realized by switching between the first power transmission pathway and the second power transmission pathway, according to shift characteristics of a shift performed in the stepless speed change mechanism, when an amount of driving request made by a driver is equal to or smaller than a predetermined value.

* * * * *